US011579744B2

(12) United States Patent
Wilde

(10) Patent No.: US 11,579,744 B2
(45) Date of Patent: Feb. 14, 2023

(54) SYSTEMS AND METHODS FOR SEAT SELECTION IN VIRTUAL REALITY

(71) Applicant: Navitaire LLC, Minneapolis, MN (US)

(72) Inventor: Justin Steven Wilde, Salt Lake City, UT (US)

(73) Assignee: NAVITAIRE LLC, Minneapolis, MN (US)

( * ) Notice: Subject to any disclaimer, the term of this patent is extended or adjusted under 35 U.S.C. 154(b) by 593 days.

(21) Appl. No.: 15/629,719

(22) Filed: Jun. 21, 2017

(65) Prior Publication Data

US 2018/0373411 A1    Dec. 27, 2018

(51) Int. Cl.
*G06F 3/048*       (2013.01)
*G06F 3/04815*     (2022.01)
(Continued)

(52) U.S. Cl.
CPC ........ *G06F 3/04815* (2013.01); *G06F 16/954* (2019.01); *G06F 16/9535* (2019.01); *G06F 3/04842* (2013.01); *G06Q 10/02* (2013.01)

(58) Field of Classification Search
CPC .. G06F 16/9535; G06F 3/013; G06F 3/04815; G06F 3/04817; G06F 16/24578;
(Continued)

(56) References Cited

U.S. PATENT DOCUMENTS 6,215,498 B1 *  4/2001  Filo .................. G06F 3/011
                                                345/419
7,386,799 B1 *  6/2008  Clanton ............. A63F 13/12
                                                715/758
(Continued)

FOREIGN PATENT DOCUMENTS

CN       106598219 A      4/2017
GB          2377150 A     12/2002
WO    WO 2011/143662 A1   11/2011

OTHER PUBLICATIONS

F. M. Rivera, F. Fuijk and E. Izquierdo, "Navigation in Reverie'S virtual environments," 2015 IEEE Virtual Reality (VR), Arles, France, 2015, pp. 273-274, doi: 10.1109/VR.2015.7223401. (Year: 2015).*

(Continued)

*Primary Examiner* — Steven B Theriault
(74) *Attorney, Agent, or Firm* — Finnegan, Henderson, Farabow, Garrett & Dunner LLP

(57) ABSTRACT

The embodiments described herein provide technologies and techniques for using available data (from a variety of data sources) to provide an integrated and virtual reality experience. Embodiments described herein include systems and methods for acquiring flight information, wherein the flight information includes at least one of seating information regarding layout and availability of seats from one or more data sources, providing the flight information in a virtual reality environment, receiving, from a virtual reality device, a user's movements of an avatar in the virtual reality environment, wherein the avatar represents an individual having pre-stored information, determining, in the virtual reality environment, a position of the avatar with respect to a first seat zone surrounding a first available seat, and assigning the avatar to the first available seat in response to the virtual reality computing system receiving a deliver command when the avatar is in vicinity of the first seat zone surrounding the first available seat.

34 Claims, 17 Drawing Sheets

(51) Int. Cl.
*G06F 16/954* (2019.01)
*G06F 16/9535* (2019.01)
*G06F 3/04842* (2022.01)
*G06Q 10/02* (2012.01)

(58) Field of Classification Search
CPC ............ G06F 16/338; G06F 16/90335; G06F 3/0485; G06F 9/451; G06F 3/011; G06F 16/904; G06F 16/954; G06F 3/048; G06F 3/0482; G06F 16/00; G06F 16/5866; G06F 3/016; G06F 3/04842; G06F 3/04847; G06F 3/017; G06F 3/012; G06F 1/163; G06F 3/0304; G06F 3/041; G06F 3/0488; G06F 3/04886; G06F 3/147; G06F 3/04845; G06F 3/0487; G06T 19/006; G06T 19/003; G06Q 10/02; G06V 20/20
See application file for complete search history.

(56) References Cited

U.S. PATENT DOCUMENTS

| | | | | |
|---|---|---|---|---|
| 8,091,030 | B1* | 1/2012 | Ballagh | G06T 15/503 715/794 |
| 8,543,259 | B2* | 9/2013 | Schalla | B64D 11/04 701/3 |
| 8,667,402 | B2* | 3/2014 | Goldman | G06F 3/04815 715/757 |
| 8,902,227 | B2* | 12/2014 | Harrison | G06T 19/006 345/420 |
| 9,239,992 | B2* | 1/2016 | Valentino | G06Q 30/0641 |
| 9,396,588 | B1* | 7/2016 | Li | G06F 3/011 |
| 9,633,402 | B1* | 4/2017 | McCartney | G06Q 30/0629 |
| 10,062,205 | B2* | 8/2018 | Eikhoff | G06F 16/5854 |
| 10,181,218 | B1* | 1/2019 | Goetzinger, Jr. | G06Q 30/0643 |
| 10,380,469 | B2* | 8/2019 | Troy | G06F 3/1454 |
| 10,621,784 | B2* | 4/2020 | Khan | H04N 13/366 |
| 10,687,145 | B1* | 6/2020 | Campbell | G10K 11/17821 |
| 11,157,137 | B2* | 10/2021 | Salles | G06Q 30/0643 |
| 11,195,034 | B2* | 12/2021 | Wisch | G06Q 50/14 |
| 2001/0034661 | A1* | 10/2001 | Ferreira | G06F 3/04815 705/14.4 |
| 2003/0214536 | A1* | 11/2003 | Jarrett | G06V 30/1423 715/831 |
| 2008/0086696 | A1* | 4/2008 | Sri Prakash | A63F 13/67 715/757 |
| 2008/0158254 | A1* | 7/2008 | Jiang | G06T 15/503 345/441 |
| 2009/0063208 | A1* | 3/2009 | Stirlen | G06Q 10/02 705/6 |
| 2009/0109223 | A1* | 4/2009 | Schalla | B64D 11/0015 345/427 |
| 2009/0271227 | A1* | 10/2009 | Hayat | G06Q 30/0601 705/6 |
| 2009/0318224 | A1* | 12/2009 | Ealey | A63F 13/12 463/31 |
| 2009/0319902 | A1* | 12/2009 | Kneller | G06F 3/048 715/733 |
| 2010/0138874 | A1* | 6/2010 | Deutschman | G06Q 10/02 725/60 |
| 2010/0217458 | A1* | 8/2010 | Schweiger | B64D 11/0015 701/3 |
| 2011/0072367 | A1* | 3/2011 | Bauer | G06F 3/04815 715/757 |
| 2011/0221745 | A1* | 9/2011 | Goldman | G06Q 30/02 345/419 |
| 2011/0225519 | A1* | 9/2011 | Goldman | G06F 3/0481 715/757 |
| 2011/0239136 | A1* | 9/2011 | Goldman | G06Q 10/10 715/757 |
| 2012/0010910 | A1* | 1/2012 | Lele | G06Q 10/02 705/5 |
| 2012/0010913 | A1* | 1/2012 | Lele | G06Q 10/02 705/5 |
| 2012/0054281 | A1* | 3/2012 | Westmoreland | G06Q 10/10 709/205 |
| 2012/0078667 | A1* | 3/2012 | Denker | G06Q 30/0643 705/5 |
| 2012/0226987 | A1* | 9/2012 | Wie | H04L 47/283 715/736 |
| 2013/0013157 | A1* | 1/2013 | Kim | B60R 16/037 701/49 |
| 2013/0044128 | A1* | 2/2013 | Liu | G09G 5/00 345/633 |
| 2013/0054278 | A1* | 2/2013 | Sharp | G06Q 10/02 705/5 |
| 2013/0063432 | A1* | 3/2013 | Kaps | G06T 13/40 345/419 |
| 2013/0201104 | A1* | 8/2013 | Ptucha | G06F 3/017 345/158 |
| 2013/0201105 | A1* | 8/2013 | Ptucha | G06F 3/017 345/158 |
| 2013/0227437 | A1* | 8/2013 | Brody | H04L 12/1822 715/757 |
| 2013/0268899 | A1* | 10/2013 | Valentino | G06Q 10/02 715/852 |
| 2013/0283166 | A1* | 10/2013 | Van Wie | H04L 51/043 715/727 |
| 2014/0052482 | A1* | 2/2014 | Le Marier | G06Q 10/02 705/5 |
| 2014/0095223 | A1* | 4/2014 | Oxenham | G06Q 10/02 705/5 |
| 2014/0115059 | A1* | 4/2014 | Van Wie | H04W 4/50 709/204 |
| 2014/0156317 | A1* | 6/2014 | Eijdenberg | G06Q 10/02 705/5 |
| 2014/0188527 | A1* | 7/2014 | Oxenham | G08B 5/221 705/5 |
| 2014/0257879 | A1* | 9/2014 | Sink | G06Q 10/02 705/5 |
| 2014/0349683 | A1* | 11/2014 | D'Argenio | H04N 21/4316 455/456.3 |
| 2015/0012307 | A1* | 1/2015 | Moss | G06Q 10/02 705/5 |
| 2015/0127486 | A1* | 5/2015 | Advani | G06Q 30/0241 705/26.41 |
| 2015/0301781 | A1* | 10/2015 | Ekkaia | H05B 45/28 362/237 |
| 2015/0332387 | A1* | 11/2015 | Stacey | G06F 16/955 705/27.2 |
| 2016/0026253 | A1* | 1/2016 | Bradski | G02B 27/0172 345/8 |
| 2016/0110916 | A1* | 4/2016 | Eikhoff | G06T 17/20 345/420 |
| 2016/0170996 | A1* | 6/2016 | Frank | G06F 16/24578 707/748 |
| 2016/0170998 | A1* | 6/2016 | Frank | H04W 4/021 707/748 |
| 2016/0187969 | A1* | 6/2016 | Larsen | G06F 3/012 345/156 |
| 2016/0350311 | A1* | 12/2016 | Reeves | G06F 3/04842 |
| 2017/0076494 | A1* | 3/2017 | Gabrys | G06F 30/00 |
| 2017/0148073 | A1* | 5/2017 | Nomula | G06F 16/957 |
| 2017/0178260 | A1* | 6/2017 | Wilde | G06F 3/011 |
| 2017/0354875 | A1* | 12/2017 | Marks | A63F 13/213 |
| 2017/0372236 | A1* | 12/2017 | Iwanami | G06F 16/29 |
| 2018/0114150 | A1* | 4/2018 | Morioka | G06Q 10/02 |
| 2018/0247454 | A1* | 8/2018 | Sawaki | G06F 3/0482 |
| 2018/0286269 | A1* | 10/2018 | Lechner | G09B 9/085 |
| 2018/0329603 | A1* | 11/2018 | Sawaki | G02B 27/017 |
| 2018/0329682 | A1* | 11/2018 | Nakabo | G06T 13/40 |
| 2018/0373411 | A1* | 12/2018 | Wilde | G06F 16/954 |
| 2019/0079298 | A1* | 3/2019 | Shoji | H04N 21/8186 |
| 2019/0094981 | A1* | 3/2019 | Bradski | G02B 30/26 |
| 2019/0099678 | A1* | 4/2019 | Khan | A63F 13/213 |
| 2019/0102941 | A1* | 4/2019 | Khan | G06T 19/003 |
| 2019/0177004 | A1* | 6/2019 | Skelly | H04N 5/23216 |
| 2019/0355178 | A1* | 11/2019 | Hermina Martinez | H04W 4/40 |

(56) References Cited

U.S. PATENT DOCUMENTS

2019/0362312 A1* 11/2019 Platt .................... G06Q 10/10
2020/0098187 A1* 3/2020 Herscher ............. G02B 27/017
2020/0143699 A1* 5/2020 Pashayev ............... G06F 3/014

OTHER PUBLICATIONS

S. Sharma, S. Otunba and J. Han, "Crowd simulation in emergency aircraft evacuation using Virtual Reality," 2011 16th International Conference on Computer Games (CGAMES), Louisville, KY, USA, 2011, pp. 12-17, doi: 10.1109/CGAMES.2011.6000319. (Year: 2011).*
Author Unknown—Airlines Technology—Seat Map Virtual Reality (VR). Feb. 17, 2017, screenshots from YouTube Video; https://www.youtube.com/watch?v=w1fw6drbVbg&t=2s (Year: 2017).*
Preliminary Search Report issued in corresponding French Application No. 1855504 dated Apr. 16, 2021 (6 pages).

* cited by examiner

1300

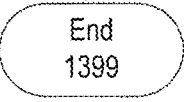

```
┌─────────────┐
│    Start    │
│    1301     │
└─────────────┘
       │
┌──────────────────────────────────────────────────────────────────────────┐
│ Acquire flight information, wherein the flight information includes at least one of seating │
│ information regarding layout and availability of seats from one or more data sources       │
│                                      1310                                                  │
└──────────────────────────────────────────────────────────────────────────┘
       │
┌──────────────────────────────────────────────────────────────────────────┐
│        Provide the flight information in a virtual reality environment                    │
│                                      1320                                                  │
└──────────────────────────────────────────────────────────────────────────┘
       │
┌──────────────────────────────────────────────────────────────────────────┐
│ Receive, from a virtual reality device, a user's movements of an avatar in the virtual     │
│ reality environment, wherein the avatar represents an individual having pre-stored         │
│                                  information                                               │
│                                      1330                                                  │
└──────────────────────────────────────────────────────────────────────────┘
       │
┌──────────────────────────────────────────────────────────────────────────┐
│ Determine, in the virtual reality environment, a position of the avatar with respect to a  │
│              first seat zone surrounding a first available seat                            │
│                                      1340                                                  │
└──────────────────────────────────────────────────────────────────────────┘
       │
┌──────────────────────────────────────────────────────────────────────────┐
│ Assign the avatar to the first available seat in response to the user issuing a deliver    │
│ command when the avatar is in the vicinity of the first seat zone surrounding the first    │
│                                  available seat                                            │
│                                      1350                                                  │
└──────────────────────────────────────────────────────────────────────────┘
       │
┌─────────────┐
│     End     │
│    1399     │
└─────────────┘
```

Fig. 13

SYSTEMS AND METHODS FOR SEAT SELECTION IN VIRTUAL REALITY

BACKGROUND

The increasing availability of data and data sources in the modern world has driven demand for and innovation in the ways that people consume data. Individuals increasingly rely on online resources and the availability of data to inform their daily behavior and interactions. This plethora of information is being made available in a variety of delivery channels and platforms.

The use of computer technology to imitate the visual world, however, remains in its infancy. Current virtual reality systems can replicate visual data from real visual environments or an imaginary scene. Although useful and entertaining, these types of systems are usually limited to simply providing a display or an environment for a specific application and its limited data set. There is a need for virtual systems that incorporate contextual information and details about the desires of a user to provide a fully integrated, virtual reality experience that utilizes the ever-expanding corpus of available data.

BRIEF DESCRIPTION OF THE DRAWINGS

Reference will now be made to the accompanying drawings showing example embodiments of this disclosure. In the drawings:

FIG. 13 is a flowchart of an exemplary method for seat selection in a virtual reality environment, consistent with embodiments of the present disclosure.

DETAILED DESCRIPTION

Figure 1:
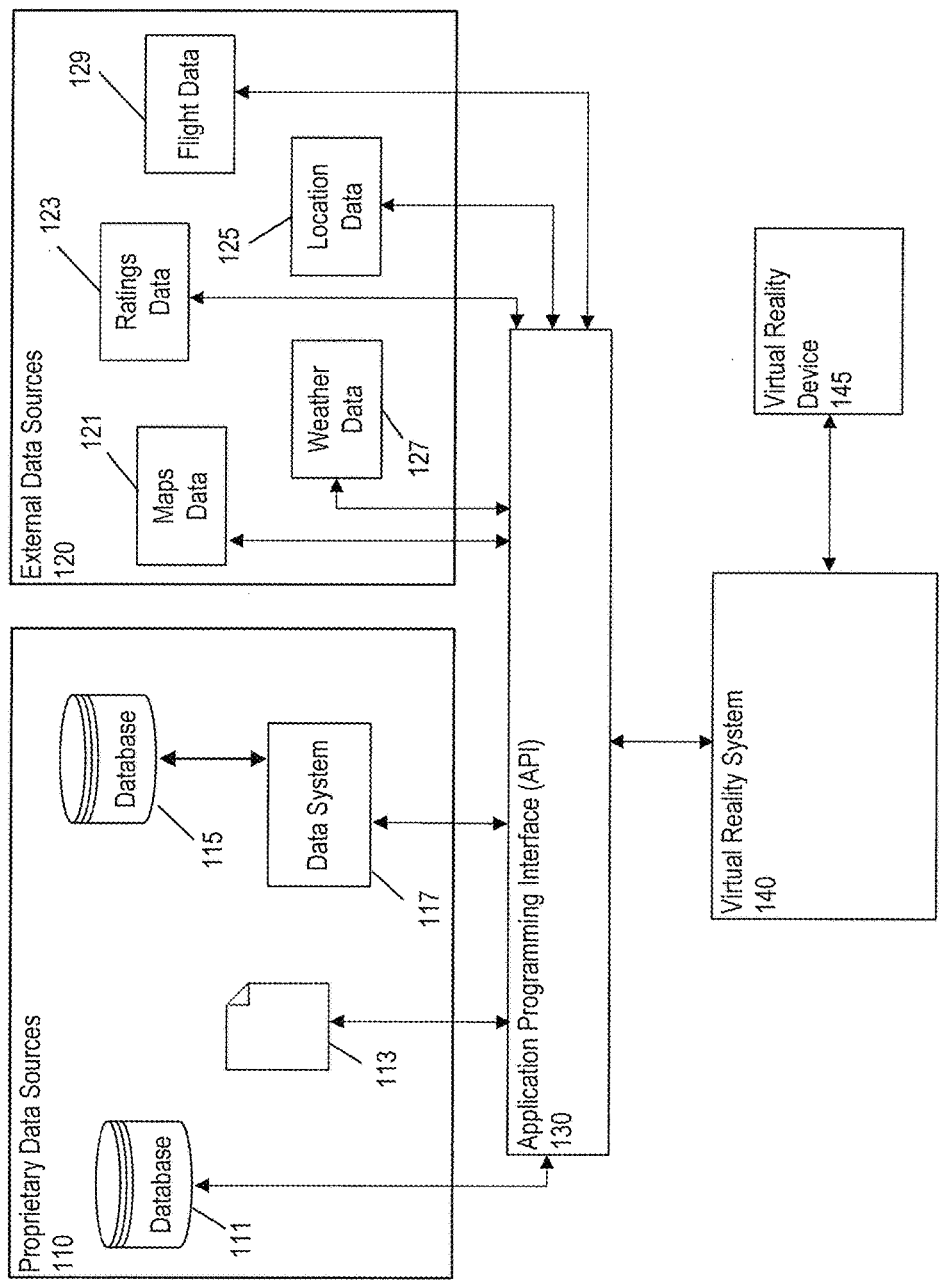
FIG. 1 is a block diagram of an exemplary system for an integrated virtual reality system, consistent with embodiments of the present disclosure.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein relate to improved interaction and integration in virtual reality systems. Virtual reality systems provide vast potential for replicating real environments and presenting imaginary ones. By means of the simulated setting, the user can interact with features of an artificial, computer-generated world.

Current virtual reality systems can use computer generated images and data to replicate a real or imaginary environment surrounding a user. Current implementations, however, of virtual reality systems fail to provide a fully integrated experience. Moreover, typical virtual reality systems are targeted to a particular application with a specific and predetermined data set.

The embodiments described herein approach these problems from a different perspective. Instead of focusing on providing a limited set of information based on a particular application, the disclosed systems integrate data from the virtual reality device itself with a plethora of external and proprietary data sources associated with the user and the application. The disclosed systems can analyze and process the available data using contextual information about the user and people associated with the user (e.g., the user's family members). The result of this data integration can be provided to the user's virtual reality device to provide an engaging and immersive environment that is as expansive as the information available to system.

Moreover, the disclosed system and methods can tailor that information based on the contextual information about the user. The system can link other data sources to context specific data related to the virtual reality environment and the interactions from the user.

For example, using data from the user's digital calendar, the disclosed system and methods can determine a time when the user is able to take a vacation or must travel for work. The disclosed systems and methods can display a virtual reality representation of available flights with specific information personalized to the user's flight preferences, seat location preferences, travel class preferences, and travel partners. The virtual reality system can transport the user virtually and place the user inside the airplane to give them a virtual tour of the area and an experience of being in the actual cabin selected. Moreover, the user can utilize the virtual reality environment to explore the available seats on a flight and specific aircraft layouts in a fully integrated virtual environment. As the user interacts with virtual controls to explore the various options, the environment can change to reflect those interactions, using data received from various data sources. Instead of simply providing information about the seat assignment, flight availability, and destinations, the disclosed system's integration of data from multiple data sources provides a tailored virtual reality experience to the user based on their specific needs or choices.

In this way, the disclosed system and methods can provide interactive experiences to the user. The majority of virtual reality systems disseminate information and provide a limited ability to interact with a limited environment. Because the disclosed system and methods provide integrated data tailored specifically to the user and from a variety of data sources, interaction and contextual information from the user can relate to any number of activities or services associated with the user. The virtual environment can utilize data about the user to fully provide a uniquely tailored experience.

The embodiments described herein provide technologies and techniques for using vast amounts of available data (from a variety of data sources) to provide an integrated and virtual reality experience. Embodiments described herein include a non-transitory computer readable storage medium storing instructions that are executable by at least one processor of a virtual reality computing system to cause a virtual reality computing system to perform a method comprising acquiring flight information, wherein the flight information includes at least one of seating information regarding layout and availability of seats from one or more data sources, providing the flight information in a virtual reality environment, receiving, from a virtual reality device, a user's movements of an avatar in the virtual reality environment, wherein the avatar represents an individual having pre-stored information, determining, in the virtual reality environment, a position of the avatar with respect to a first seat zone surrounding a first available seat, and assigning the avatar to the first available seat in response to the virtual reality computing system receiving a deliver command when the avatar is in vicinity of the first seat zone surrounding the first available seat.

In other disclosed embodiments, systems and methods are provided including one or more processors configured to cause the virtual reality computing system to acquire flight information, wherein the flight information includes at least one of seating information regarding layout and availability of seats from one or more data sources, provide the flight information in a virtual reality environment, receive, from a virtual reality device, a user's movements of an avatar in the virtual reality environment, wherein the avatar represents an individual having pre-stored information, determine, in the virtual reality environment, a position of the avatar with respect to a first seat zone surrounding a first available seat, and assign the avatar to the first available seat in response to the virtual reality computing system receiving a deliver command when the avatar is in vicinity of the first seat zone surrounding the first available seat.

The embodiments described herein further can include systems and methods for acquiring flight information, wherein the flight information includes at least one of seating information regarding layout and availability of seats from one or more data sources, providing the flight information in the virtual reality environment, receiving, from a virtual reality device, a user's movements of an avatar in the virtual reality environment, wherein the avatar represents an individual having pre-stored information, determining, in the virtual reality environment, a position of the avatar with respect to a first seat zone surrounding a first available seat, and assigning the avatar to the first available seat in response to the virtual reality computing system receiving a deliver command when the avatar is in vicinity of the first seat zone surrounding the first available seat.

FIG. 1 is a block diagram of an exemplary system 100 for an integrated virtual reality system, consistent with embodiments of the present disclosure. System 100 can include proprietary data sources 110, including database 111, data source 113, database 115, and data system 117. System 100 can further include external data sources 120 that can include maps data 121, ratings data 123, weather data 127, flight data 129, and location data 125. System 100 can include travel preference data on travel companion, seat location, travel class, and more. System 100 can further include one or more application programming interfaces (API) 130. API 130 can be implemented on a server or computer system using, for example, computing device 200, described in more detail below in reference to FIG. 2. Moreover, in some embodiments, API 130 can be implemented as multiple disparate APIs each implemented on, for example, a computing device such as computing device 200. For example, data from proprietary data sources 110 and external data sources 120 can be obtained through I/O devices 230 and/or network interface 218 of computing device 200. Further, the data can be stored during processing in a suitable storage such as storage 228 and/or system memory 221. Referring back to FIG. 1, system 100 can further include virtual reality system 140. Like API 130, virtual reality system 140 can be implemented on a server or computer system using, for example, computing device 200 (described in more detail below).

System 100 can further include virtual reality device 145. Virtual reality device 145 can be a device such as virtual reality device 375 and 385 depicted in FIG. 3B and FIG. 3C, described in more detail below, or some other virtual reality device. Moreover, virtual reality device 145 can be implemented using the components shown in device 300 shown in FIG. 3A, described in more detail below.

Figure 2:
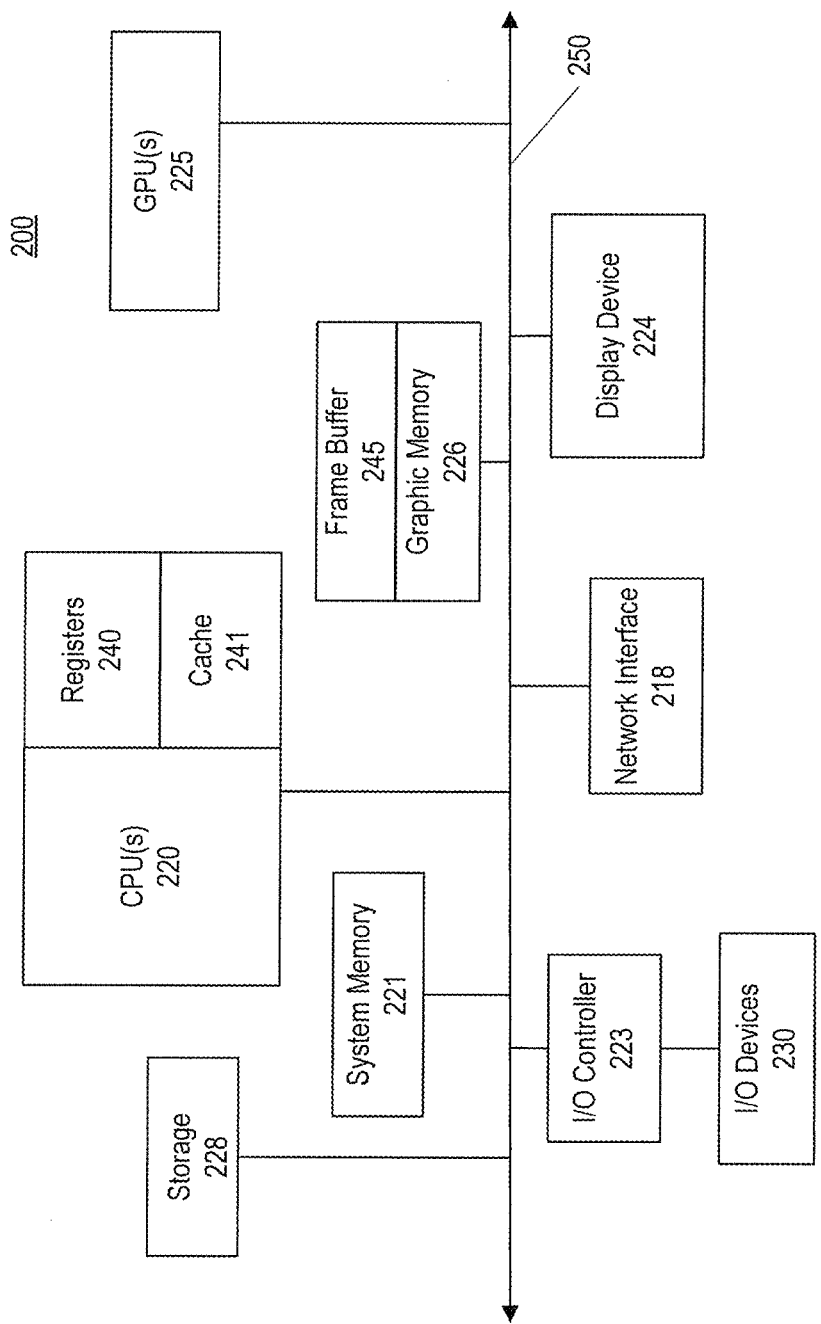
FIG. 2 is a block diagram of an exemplary computing device, consistent with embodiments of the present disclosure.

FIG. 2 is a block diagram of an exemplary computing device 200, consistent with embodiments of the present disclosure. In some embodiments, computing device 200 can be a specialized server providing the functionality described herein. In some embodiments, components of system 100 such as proprietary data sources 110 (e.g., database 111, data source 113, database 115, and data system 117), API 130, virtual reality system 140, and augmented virtual reality device 145) can be can be implemented using computing device 200 or multiple computing devices 200 operating in parallel. Further, computing device 200 can be a second device providing the functionality described herein or receiving information from a server to provide at least some of the described functionality. Moreover, computing device 200 can be an additional device or devices that store and/or provide data consistent with embodiments of the present disclosure.

Computing device 200 can include one or more central processing units (CPUs) 220 and system memory 221. Computing device 200 can also include one or more graphics processing units (GPUs) 225 and graphic memory 226. In some embodiments, computing device 200 can be a headless computing device that does not include GPU(s) 225 and/or graphics memory 226.

CPUs 220 can be single or multiple microprocessors, field-programmable gate arrays, or digital signal processors capable of executing sets of instructions stored in a memory (e.g., system memory 221), a cache (e.g., cache 241), or a register (e.g., one of registers 240). CPUs 220 can contain one or more registers (e.g., registers 240) for storing variable types of data including, inter alia, data, instructions, floating point values, conditional values, memory addresses for locations in memory (e.g., system memory 221 or graphic memory 226), pointers and counters. CPU registers 240 can include special purpose registers used to store data associated with executing instructions such as an instruction pointer, instruction counter, and/or memory stack pointer. System memory 221 can include a tangible and/or non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive and/or flash memory, processor cache, memory register, or a semiconductor memory. System memory 221 can be one or more memory chips capable of storing data and allowing direct access by CPUs 220. System memory 221 can be any type of random access memory (RAM), or other available memory chip capable of operating as described herein.

CPUs 220 can communicate with system memory 221 via a system interface 250, sometimes referred to as a bus. In embodiments that include GPUs 225, GPUs 225 can be any type of specialized circuitry that can manipulate and alter memory (e.g., graphic memory 226) to provide and/or accelerate the creation of images. GPUs 225 can store images in a frame buffer (e.g., frame buffer 245) for output to a display device such as display device 224. In some embodiments, images stored in frame buffer 245 can be provided to other computing devices through network interface 218 or I/O devices 230. GPUs 225 can have a highly parallel structure optimized for processing large, parallel blocks of graphical data more efficiently than CPUs 220. Furthermore, the functionality of GPUs 225 can be included in a chipset of a special purpose processing unit or a co-processor.

CPUs 220 can execute programming instructions stored in system memory 221 or other memory, operate on data stored in memory (e.g., system memory 221) and communicate with GPUs 225 through the system interface 250, which bridges communication between the various components of computing device 200. In some embodiments, CPUs 220, GPUs 225, system interface 250, or any combination thereof, are integrated into a single chipset or processing unit. GPUs 225 can execute sets of instructions stored in memory (e.g., system memory 221), to manipulate graphical data stored in system memory 221 or graphic memory 226. For example, CPUs 220 can provide instructions to GPUs 225, and GPUs 225 can process the instructions to render graphics data stored in the graphic memory 226. Graphic memory 226 can be any memory space accessible by GPUs 225, including local memory, system memory, on-chip memories, and hard disk. GPUs 225 can enable displaying of graphical data stored in graphic memory 226 on display device 224 or can process graphical information and provide that information to connected devices through network interface 218 or I/O devices 230.

Computing device 200 can include display device 224 and input/output (I/O) devices 230 (e.g., a keyboard, a mouse, or a pointing device) connected to I/O controller 223. I/O controller 223 can communicate with the other components of computing device 200 via system interface 250. It is appreciated that CPUs 220 can also communicate with system memory 221 and other devices in manners other than through system interface 250, such as through serial communication or direct point-to-point communication. Similarly, GPUs 225 can communicate with graphic memory 226 and other devices in ways other than system interface 250. In addition to receiving input, CPUs 220 can provide output via I/O devices 230 (e.g., through a printer, speakers, or other output devices).

Furthermore, computing device 200 can include a network interface 218 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a, 802.11b, 802.11b/g/n, 802.11ac, Bluetooth, Bluetooth LTE, 3GPP, or WiMax standards), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3A:
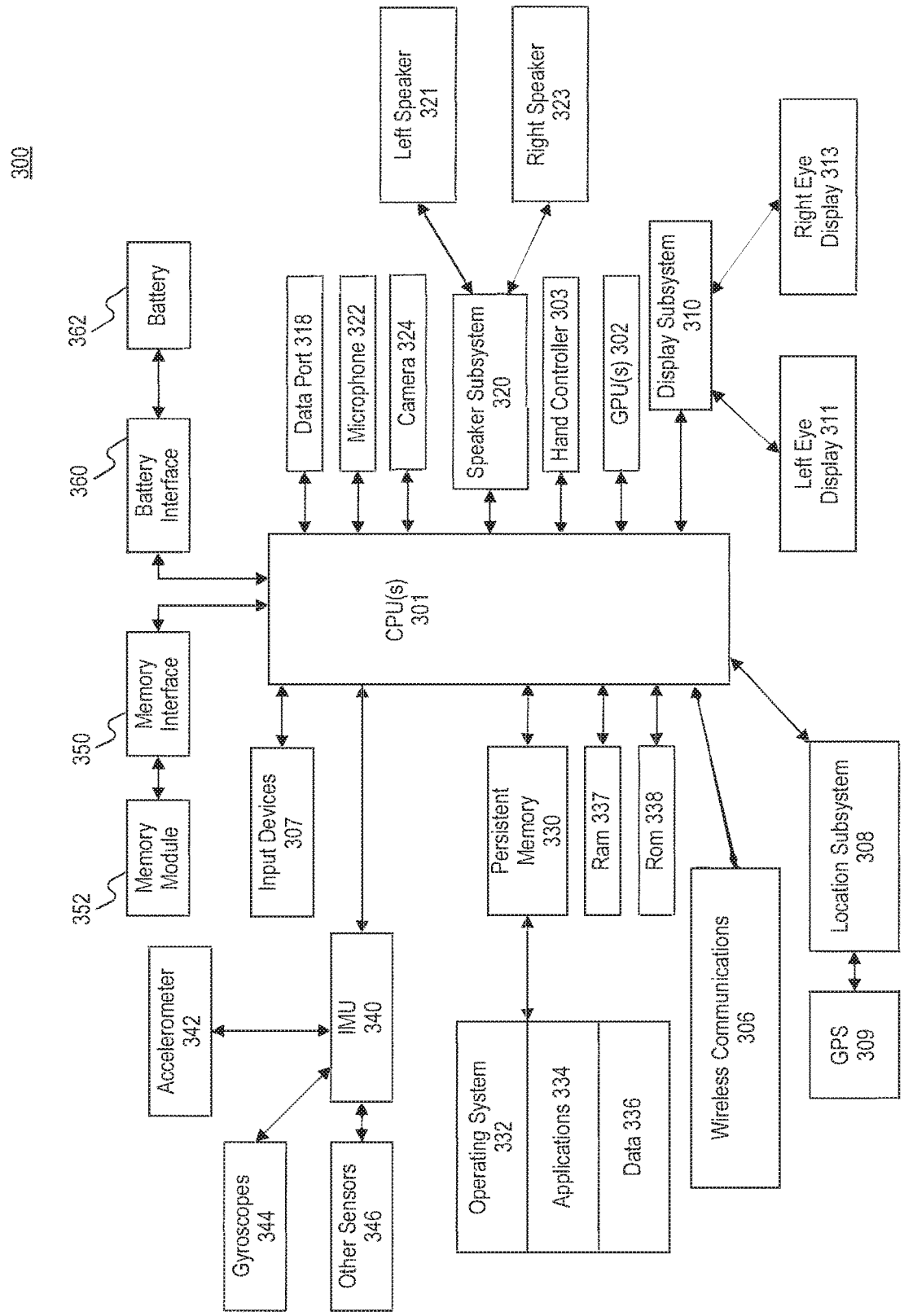
FIGS. 3A-3C are diagrams of exemplary virtual reality devices, consistent with embodiments of the present disclosure.
Figure 3B:
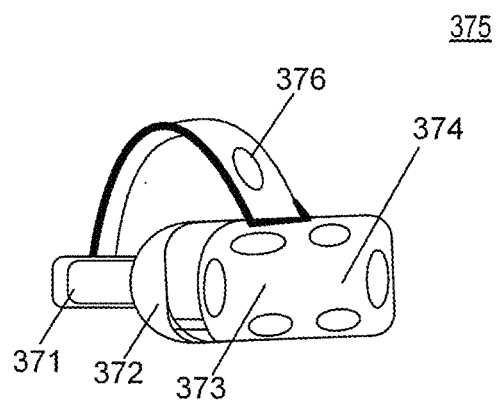
Figure 3C:
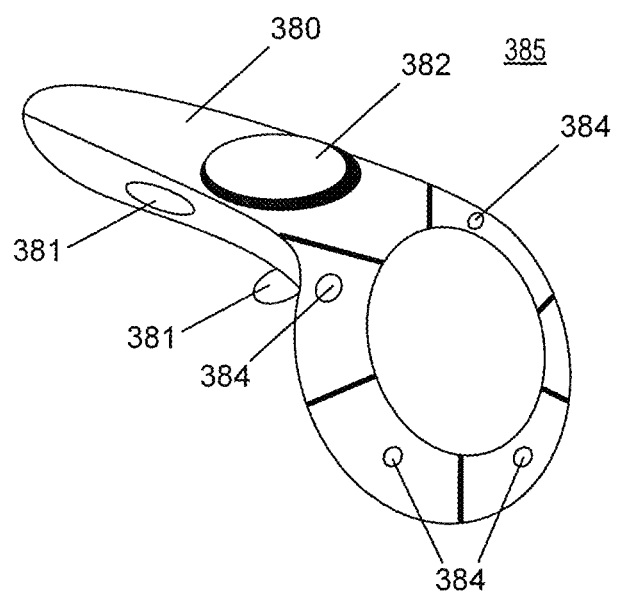

FIGS. 3A-3C are diagrams of exemplary virtual reality devices 300, 375, and 385, consistent with embodiments of the present disclosure. These exemplary virtual reality devices can represent the internal components (e.g., as shown in FIG. 3A) of a virtual reality device and the external components (e.g., as show in FIG. 3B-3C) of a virtual reality device. In some embodiments, FIG. 3A can represent an exemplary electronic device 300 contained within virtual reality device 375 and/or hand controller 385 of FIG. 3B-3C. FIG. 3C can represent an exemplary hand controller 303 of FIG. 3A.

FIG. 3A is a simplified block diagram illustrating an example electronic device 300. In some embodiments, electronic device 300 can include a virtual reality device having video display capabilities and the capability to communicate with other computer systems, for example, via the Internet. Depending on the functionality provided by electronic device 300, in various embodiments, electronic device 300 can be, can include, or can be connected to a handheld device, a multiple-mode communication device configured for both data and voice communication, a smartphone, a mobile telephone, a laptop, a computer wired to the network, a netbook, a gaming console, a tablet, a smart watch, eye glasses, a headset, goggles, or a PDA enabled for networked communication.

Electronic device 300 can include a case (not shown) housing component of electronic device 300. The internal components of electronic device 300 can, for example, be constructed on a printed circuit board (PCB). Although the components and subsystems of electronic device 300 can be realized as discrete elements, the functions of the components and subsystems can also be realized by integrating, combining, or packaging one or more elements together in one or more combinations.

Electronic device 300 can include a controller comprising one or more CPU(s) 301, which controls the overall operation of electronic device 300. CPU(s) 301 can be one or more microprocessors, field programmable gate arrays (FPGAs), digital signal processors (DSPs), or any combination thereof capable of executing particular sets of instructions. CPU(s) 301 can interact with device subsystems such as a wireless communication system 306 for exchanging radio frequency signals with a wireless network to perform communication functions, speaker subsystem 320 for producing audio, location subsystem 308 for acquiring location information, and display subsystem 310 for producing display elements.

CPU(s) 301 can also interact with input devices 307, a persistent memory 330, a random access memory (RAM) 337, a read only memory (ROM) 338, a data port 318 (e.g., a conventional serial data port, a Universal Serial Bus (USB) data port, a 30-pin data port, a Lightning data port, or a High-Definition Multimedia Interface (HDMI) data port), a microphone 322, camera 324, and wireless communications 306 (which can employ any appropriate wireless (e.g., RF), optical, or other short range communications technology (for example, WiFi, Bluetooth or NFC)). Some of the subsystems shown in FIG. 3 perform communication-related functions, whereas other subsystems can provide "resident" or on-device functions.

Wireless communications 306 includes communication systems for communicating with a network to enable communication with any external devices (e.g., a server, not shown). The particular design of wireless communications 306 depends on the wireless network in which electronic device 300 is intended to operate. Electronic device 300 can send and receive communication signals over the wireless network after the required network registration or activation procedures have been completed.

Location subsystem 308 can provide various systems such as global positioning system (e.g., GPS 309) that provide location information. Additionally, location subsystem can utilize location information from connected devices (e.g., connected through wireless communications 306) to further provide location data. The location information provided by location subsystem 308 can be stored in, for example, persistent memory 330, and used by applications 334 and operating system 332.

Display subsystem 310 can control various displays (e.g., left eye display 311 and right eye display 313). In order to provide a virtual reality display, display subsystem 310 can provide for the display of graphical elements (e.g., those generated using GPU(s) 302). In other embodiments, the display generated on left eye display 311 and right eye display 313 can include an image captured from camera 324 and reproduced with virtual graphical elements. Moreover, display subsystem 310 can display different graphics on left eye display 311 and right eye display 313 to show different elements or to provide a simulation of depth or perspective to create a virtual reality environment. In some embodiments, left eye display 311 and right eye display 313 can be part of a component separate from electronic device 300 connected through, for example, wireless communications 306 or data port 318.

Camera 324 can be a CMOS camera, a CCD camera, or any other type of camera capable of capturing and outputting compressed or uncompressed image data such as still images or video image data. In some embodiments electronic device 300 can include more than one camera. Image data output from camera 324 can be stored in, for example, an image buffer, which can be a temporary buffer residing in RAM 337, or a permanent buffer residing in ROM 338 or persistent memory 330. The image buffer can be, for example, a first-in first-out (FIFO) buffer. In some embodiments the image buffer can be provided directly to GPU(s) 302 and display subsystem 310 for display on left eye display 311 and/or right eye display 313. In some embodiments, the camera information stored in the image buffer can be processed by, for example, CPU(s) 301 or GPU(s) 302 for incorporation into the virtual environment provided through display subsystem 310. In these embodiments, for example, the camera input can be utilized for head tracking or inside-out positional tracking.

Electronic device can include an inertial measurement unit (e.g., IMU 340) for measuring motion and orientation data associated with electronic device 300. IMU 340 can utilize accelerometer 342, gyroscopes 344, and other sensors 346 to capture specific force, angular rate, magnetic fields, and biometric information for use by electronic device 300. The data capture by IMU 340 and the associated sensors (e.g., accelerometer 342, gyroscopes 344, and other sensors 346) can be stored in memory such as persistent memory 330 or RAM 337 and used by applications 334 and operating system 332. The data gathered through IMU 340 and its associated sensors can also be provided to networked devices through, for example, wireless communications 306.

CPU(s) 301 can be one or more processors that operate under stored program control and executes software modules stored in a tangibly-embodied non-transitory computer-readable storage medium such as persistent memory 330, which can be a register, a processor cache, a Random Access Memory (RAM), a flexible disk, a hard disk, a CD-ROM (compact disk-read only memory), and MO (magneto-optical), a DVD-ROM (digital versatile disk-read only memory), a DVD RAM (digital versatile disk-random access memory), or other semiconductor memories.

Software modules can also be stored in a computer-readable storage medium such as ROM 338, or any appropriate persistent memory technology, including EEPROM, EAROM, FLASH. These computer-readable storage mediums store computer-readable instructions for execution by CPU(s) 301 to perform a variety of functions on electronic device 300. Alternatively, functions and methods can also be implemented in hardware components or combinations of hardware and software such as, for example, ASICs and/or special purpose computers.

The software modules can include operating system software 332, used to control operation of electronic device 300. Additionally, the software modules can include software applications 334 for providing additional functionality to electronic device 300. For example, software applications 334 can include applications designed to interface with systems like system 100 above. Applications 334 can provide specific functionality to allow electronic device 300 to interface with different data systems and to provide enhanced functionality.

Software applications 334 can also include a range of applications, including, for example, an e-mail messaging application, an address book, a notepad application, an Internet browser application, a voice communication (i.e., telephony or Voice over Internet Protocol (VoIP)) application, a mapping application, a media player application, a health-related application, etc. Each of software applications 334 can include layout information defining the placement of particular fields and graphic elements intended for display on the virtual reality display (e.g., through display subsystem 310) according to that corresponding application. In some embodiments, software applications 334 are software modules executing under the direction of operating system 332. Additionally, in some embodiments, the software applications can include content embedded within web pages designed to be viewed using a virtual reality device.

Operating system 332 can provide a number of application protocol interfaces (APIs) providing an interface for communicating between the various subsystems and services of electronic device 300, and software applications 334. For example, operating system software 332 provides a graphics API to applications that need to create graphical elements for display on electronic device 300. Accessing the user interface API can provide the application with the functionality to create and manage virtual reality interface controls, such as overlays; receive input via camera 324, microphone 322, or input device 307; and other functionality intended for display through display subsystem 310. Furthermore, a camera service API can allow for the capture of video through camera 324 for purposes of capturing image data such as an image or video data that can be processed and used for providing virtual reality through display subsystem 310.

In some embodiments, the components of electronic device 300 can be used together to provide input from the user to electronic device 300. For example, display subsystem 310 can include interactive controls on left eye display 311 and right eye display 313. As part of the virtual reality display, these controls can appear in front of the user of electronic device 300. This input can be processed by electronic device 300. The input can be received from, for example, input devices 307. In some embodiments input devices 307 can be one or more of hand controller 385 shown in FIG. 3C. In these embodiments, data received from hand controller 385 can be processed directly or can be combined with data from the other components of device 300 such as, for example, IMU 340, display subsystem 310, camera 324, and data port 318 to provide input to CPU(s) 301.

In some embodiments, persistent memory 330 stores data 336, including data specific to a user of electronic device 300, such as information of user accounts or device specific identifiers. Persistent memory 330 can also store data relating to those (e.g., contents, notifications, and messages) obtained from services accessed by electronic device 300. Persistent memory 330 can further store data relating to various applications with preferences of the particular user of, for example, electronic device 300. In some embodiments, persistent memory 330 can store data 336 linking a user's data with a particular field of data in an application, such as for automatically providing a user's credentials to an application executing on electronic device 300. Furthermore, in various embodiments, data 336 can also include service data comprising information required by electronic device 300 to establish and maintain communication with a network.

In some embodiments, electronic device 300 can also include one or more removable memory modules 352 (e.g., FLASH memory) and a memory interface 350. Removable memory module 352 can store information used to identify or authenticate a user or the user's account to a wireless network. For example, in conjunction with certain types of wireless networks, including GSM and successor networks, removable memory module 352 is referred to as a Subscriber Identity Module (SIM). Memory module 352 can be inserted in or coupled to memory module interface 350 of electronic device 300 in order to operate in conjunction with the wireless network.

Electronic device 300 can also include a battery 362, which furnishes energy for operating electronic device 300. Battery 362 can be coupled to the electrical circuitry of electronic device 300 through a battery interface 360, which can manage such functions as charging battery 362 from an external power source (not shown) and the distribution of energy to various loads within or coupled to electronic device 300.

A set of applications that control basic device operations, including data and possibly voice communication applications, can be installed on electronic device 300 during or after manufacture. Additional applications or upgrades to operating system software 332 or software applications 334 can also be loaded onto electronic device 300 through data port 318, wireless communications 306, memory module 352, or other suitable system. The downloaded programs or code modules can be permanently installed, for example, written into the persistent memory 330, or written into and executed from RAM 337 for execution by CPU(s) 301 at runtime.

FIG. 3B is an exemplary virtual reality device 375. In some embodiments, virtual reality device 375 can be goggles or other headgear that provides a virtual reality representation for the wearer. In other embodiments (not shown in FIG. 3B) the virtual reality device can be part of, can be connected to, or can include a computer, mobile device, portable telecommunications device, tablet, PDA, or other computing device as described in relation to FIG. 3A.

As shown in FIG. 3B, virtual reality device 375 can also include processing components 372. Processing components 372 can be enclosures that house the circuitry and modules described above in relation to FIG. 3A. The processing hardware and/or components can be housed in only one side of virtual reality device 375. In yet other embodiments, the processing hardware and/or components can be housed in both sides of virtual reality device 375. The components shown in FIG. 3A can be included in any part of virtual reality device 375.

In some embodiments virtual reality device 375 can house only some of the components described in relation to FIG. 3A. For example, virtual reality device 375 can include IMU 340, camera 324, microphone 322, speaker subsystem 320, and display subsystem 310 while the remainder of the components reside in a mobile device, computer, tablet, PDA or some other enclosure connected to virtual reality device 375 (e.g., though, among others, data port 318 and wireless communications 306).

As shown in FIG. 3B, virtual reality device 375 can also include rear headgear component 371. Rear headgear component 371 can use an adjustable strap to secure the virtual reality device 375 on the wearer. As further depicted in FIG. 3B, virtual reality device 375 can also include sensors 376. Sensors 376 can allow for communication with hand controller 303 and CPU 301 of the device 300 in FIG. 3A. In some embodiments, virtual reality device 375 can contain one or more sensors 376. Sensors 376 can detect, among other things, movements in the environment, movements of virtual reality device 375 in relation to the environment, and input or movement from hand controller 303. The data from sensors 376 can be provided to CPU(s) 301.

In some embodiments, virtual reality device 375 can include display devices 374 and 373. These display devices can be respectively associated with left eye display 311 and right eye display 313 of FIG. 3A. In these embodiments, display devices 374 and 373 can receive the appropriate display information from left eye display 311, right eye display 313, and display subsystem 310, and display the virtual reality environment. Through this process, virtual reality display device 375 can provide virtual reality graphical elements to be shown in the wearer's field of view. By providing different images to display devices 373 and 374, virtual reality device 375 can create perspective, depth, and other visual illusions to create a virtual reality environment around the user.

Some embodiments of virtual reality device 375 can include speakers (not shown in FIG. 3B). These speakers can be associated with, for example, speaker subsystem 320, left speaker 321, and right speaker 323 from FIG. 3A. Virtual reality device 375 can provide audio through the speakers. By adjusting the sound that is provided to the left and right speakers, virtual reality device 375 can further simulate a virtual reality environment around the user.

FIG. 3C is an exemplary view of one hand controller 385 (which can come in a pair), a component of a virtual reality device, consistent with embodiments of the present disclosure. FIG. 3C can represent an exemplary hand controller 303 of FIG. 3A. Hand controller 303 can be used to provide input from the user to the electronic device 300. A user can grip, by hand, body 380 of hand controller 385 displayed in FIG. 3C. Moreover, hand controller 385 can include trackpad 382, button 381, and sensor 384 to receive additional user input. Movements and interactions with hand controller 385 can be detected by sensors 384 and translated by the virtual reality system into virtual movements and selections in the virtual environment. For example, raising hand controller 385 can result in sensors 384 transmitting the movement information to device 300 of FIG. 3A, which can translate the movement data into changes to the virtual environment. In this example, these changes can be provided, by virtual reality device 300 to the virtual reality display device 375 through, for example, display subsystem 310. The user's physical movements of hand controller 385 can, accordingly, be represented in the virtual reality environment displayed by virtual reality device 375.

It is appreciated that the physical shape and layout of hand controller 385 is exemplary. In some embodiments, hand controller 385 can take different shapes. For example, hand controller 385 can be a glove, allowing for exact representation of the movements of the user's fingers in the virtual environment. Thus, the user has the ability to move hands and fingers in a three-dimensional space to interact and manipulate the provided virtual environment. In some embodiments, hand controller 385 may not be needed, as virtual reality system 140 can use a line of motion sensing device detecting, for examples, a user's gestures and spoken commands.

Referring back to FIG. 1, each of databases 111 and 115, data source 113, data system 117, API 130, and virtual reality system 140 can be a module, which is a packaged functional hardware unit (e.g., portions of an integrated circuit) designed for use with other components or a part of a program (stored on a computer readable medium) that performs a particular function of related functions. Each of these modules can be implemented using computing device 200 of FIG. 2. Each of these components is described in more detail below. In some embodiments, the functionality of system 100 can be split across multiple computing devices (e.g., multiple devices similar to computing device 200) to allow for distributed processing of the data. In these embodiments the different components can communicate over I/O device 230 or network interface 218 of FIG. 2's computing device 200.

Data can be made available to system 100 through proprietary data sources 110 and external data sources 120. It is appreciated that the exemplary data sources shown for each (e.g., databases 111 and 115, data source 113, and data system 117 of proprietary data sources 110 and maps data 121, ratings data 123, weather data 127, flight data 129, and location data 125 of external data sources 120) are not exhaustive. Many different data sources and types of data can exist in both proprietary data sources 110 and external data sources 120. Moreover, some of the data can overlap among external data sources 120 and proprietary data sources 110. For example, external data sources 120 can provide preference data which can include data about specific travel class or seat location preference. This same data can also be included, in the same or a different form, in, for example, database 111 of proprietary data sources 110.

Moreover any of the data sources in proprietary data sources 110 and external data sources 120, or any other data sources used by system 100, can be a Relational Database Management System (RDBMS) (e.g., Oracle Database, Microsoft SQL Server, MySQL, PostgreSQL, and/or IBM DB2). An RDBMS can be designed to efficiently return data for an entire row, or record, in as few operations as possible. An RDBMS can store data by serializing each row of data. For example, in an RDBMS, data associated with a record can be stored serially such that data associated with all categories of the record can be accessed in one operation. Moreover, an RDBMS can efficiently allow access of related records stored in disparate tables by joining the records on common fields or attributes.

In some embodiments, any of the data sources in proprietary data sources 110 and external data sources 120, or any other data sources used by system 100, can be a non-relational database management system (NRDBMS) (e.g., XML, Cassandra, CouchDB, MongoDB, Oracle NoSQL Database, FoundationDB, and/or Redis). A non-relational database management system can store data using a variety of data structures such as, among others, a key-value store, a document store, a graph, and a tuple store. For example, a non-relational database using a document store could combine all of the data associated with a particular record into a single document encoded using XML. A non-relational database can provide efficient access of an entire record and provide for effective distribution across multiple data systems.

In some embodiments, any of the data sources in proprietary data sources 110 and external data sources 120, or any other data sources used by system 100, can be a graph database (e.g., Neo4j or Titan). A graph database can store data using graph concepts such as nodes, edges, and properties to represent data. Records stored in a graph database can be associated with other records based on edges that connect the various nodes. These types of databases can efficiently store complex hierarchical relationships that are difficult to model in other types of database systems.

In some embodiments, any of the data sources in proprietary data sources 110 and external data sources 120, or any other data sources used by system 100, can be accessed through an API. For example, data system 117 could be an API that allows access to the data in database 115. Moreover, external data sources 120 can all be publicly available data accessed through an API. API 130 can access the any of the data sources through their specific API to provide additional data and information to system 100.

Although the data sources of proprietary data sources 110 and external data sources 120 are represented in FIG. 1 as isolated databases or data sources, it is appreciated that these data sources, which can utilize, among others, any of the previously described data storage systems, can be distributed across multiple electronic devices, data storage systems, or other electronic systems.

In addition to providing access directly to data storage systems such as database 111 or data source 113, proprietary data sources 110 can include data system 117. Data system 117 can connect to one or multiple data sources, such as database 115. Data system 117 can provide an interface to the data stored in database 115. In some embodiments, data system can combine the data in database 115 with other data or data system 117 can preprocess the data in database 115 before providing that data to API 130 or some other requestor.

Proprietary data sources 110 can represent various data sources (e.g., database 111, data source 113, database 115, and data system 117) that are not directly accessible or available to the public. These data sources can be provided to subscribers based on the payment of a fee or a subscription. Access to these data sources can be provided directly by the owner of the proprietary data sources or through an interface such as API 130, described in more detail below.

Although only one grouping of proprietary data sources 110 is shown in FIG. 1, a variety of proprietary data sources can be available to system 100 from a variety of providers. In some embodiments, each of the groupings of data sources will include data related to a common industry or domain. In other embodiments, the grouping of proprietary data sources can depend on the provider of the various data sources.

For example, the data sources in proprietary data sources 110 can contain data related to the airline travel industry. In this example, database 111 can contain travel profile information. In addition to basic demographic information, the travel profile data can include past travel history, traveler preferences, loyalty information, and other information related to a traveler profile. Further in this example, data source 113 can contain information related to partnerships or ancillary services such as hotels, rental cars, events, insurance, and parking. Additionally, database 115 can contain detailed information about airports, airplanes, specific seat arrangements, gate information, and other logistical information. As previously described, this information can be processed through data system 117. Accordingly, in this exemplary embodiment, the data sources in proprietary data sources 110 can provide comprehensive travel data.

Similar to proprietary data sources 110, external data sources 120 can represent various data sources (e.g., maps data 121, ratings data 123, weather data 127, flight data 129, and location data 125). Unlike proprietary data sources 110, external data sources 120 can be accessible to the public or can be data sources that are outside of the direct control of the provider of API 130 or system 100.

Although only one grouping of external data sources 120 is shown in FIG. 1, a variety of external data sources can be available to system 100 from a variety of providers. In some embodiments, each of the groupings of data sources will include data related to a common industry or domain. In other embodiments, the grouping of external data sources can depend on the provider of the various data sources. In some embodiments, the external data sources 120 can represent every external data source available to API 130.

Moreover, the specific types of data shown in external data sources 120 are merely exemplary. Additional types of data can be included and the inclusion of specific types of data in external data sources 120 is not intended to be limiting.

As shown in FIG. 1, external data sources 120 can include maps data 121. Maps data can include location, maps, and navigation information available through a provided API such as, among others, Google Maps API and/or the Open Street Map API. Ratings Data 123 can include ratings or review information about businesses, products, locations, etc. For example, ratings data 123 can include data from, among others, the Yelp API, Amazon Customer Reviews API, and/or the TripAdvisor Content API. Location data 125 can include specific data such as business profiles, operating hours, menus, or similar. Weather data 127 can be location specific weather information that can be accessed through, among others, the Dark Sky Forecast API, the Weather Channel API, the NOAA Web Services API, and/or the Weather Underground API. Flight data 129 can include flight information, gate information, and/or airport information that can be accessed through, among others, the FlightStats API, FlightWise API, FlightStats API and the FlightAware API. Each of these external data sources 120 (e.g., maps data 1221, ratings data 123, weather data 127, flight data 129, and location data 125) can provide additional data accessed through API 130.

As previously described, API 130 can provide a unified interface for accessing any of the data available through proprietary data sources 110 and external data sources 120 in a common interface. API 130 can be software executing on, for example, a computing device such as computing device 200 described in relation to FIG. 2. In these embodiments, API 130 can be written using any standard programming language (e.g., Python, Ruby, Java, C, C++, node.js, PHP, Perl, or similar) and can provide access using a variety of data transfer formats and/or protocols including, among others, SOAP, JSON objects, REST based services, XML, or similar. API 130 can provide receive request for data in a standard format and respond in a predictable format.

In some embodiments, API 130 can combine data from one or more data sources (e.g., data stored in proprietary data sources 110, external data sources 120, or both) into a unified response. Additionally, in some embodiments API 130 can process the information from the various data sources to provide additional fields or attributes not available in the raw data. This processing can be based on one or multiple data sources and can utilize one or multiple records from each data source. For example, API 130 could provide aggregated or statistical information such as averages, sums, numerical ranges, or other calculable information. Moreover, API 130 can normalize data coming from multiple data sources into a common format. The previous description of the capabilities of API 130 is only exemplary. There are many additional ways in which API 130 can retrieve and package the data provided through proprietary data sources 110 and external data sources 120.

Virtual reality system 140 can interact with virtual reality device 145 and API 130. Virtual reality system 140 can receive information related to virtual reality device 145 (e.g., through wireless communications 306 of FIG. 3). This information can include any of the information previously described in relation to FIG. 3. For example, virtual reality system can receive location information, motion information, visual information, sound information, orientation information, biometric information, or any other type of information provided by virtual reality device 145. Additionally, virtual reality system 140 can receive identifying information from virtual reality device 145 such as a device specific identifier or authentication credentials associated with the user of virtual reality device 145.

Virtual reality system 140 can process the information received and formulate requests to API 130. These requests can utilize identifying information from virtual reality device 145, such as a device identifier or authentication credentials from the user of virtual reality device 145.

Using the information from virtual reality device 145, virtual reality system 140 can request detailed information through API 130. The information returned from API 130 can be combined with the information received from virtual reality device 145 and processed by virtual reality system 140. Virtual reality system 140 can then make intelligent decisions about updated virtual reality information that should be displayed by virtual reality device 145. Exemplary use cases of this processing are described in more detail below in relation to FIGS. 6A-7D. Virtual reality device 145 can receive the updated virtual reality information and display the appropriate updates on, for example, displays 373 and 374 shown in FIG. 3B.

Unlike conventional online reservation systems offering "point and click" capabilities to select a desired seat, the embodiments disclosed herein go beyond that simple environment by immersing users in a virtual environment. While in this virtual environment, users can sometimes find it difficult to control objects within the environment. For example, some users may experience difficulty in accurately grabbing or positioning an object in a virtual space using hand controllers (e.g. controller 380 of FIG. 3C). As a result of the inherent inaccuracy of full-body movement in a virtual reality space, user errors can be made. These errors can lead not only to frustration for the user, but additional time and resource demands on the processor and virtual reality system 140 and virtual reality device 145 in order to correct those user errors, potentially increasing costs while depreciating life times of those devices. The embodiments described herein can help address these types of issues, thereby using less system resources and making the virtual reality experience more enjoyable for the user.

Figure 4A:
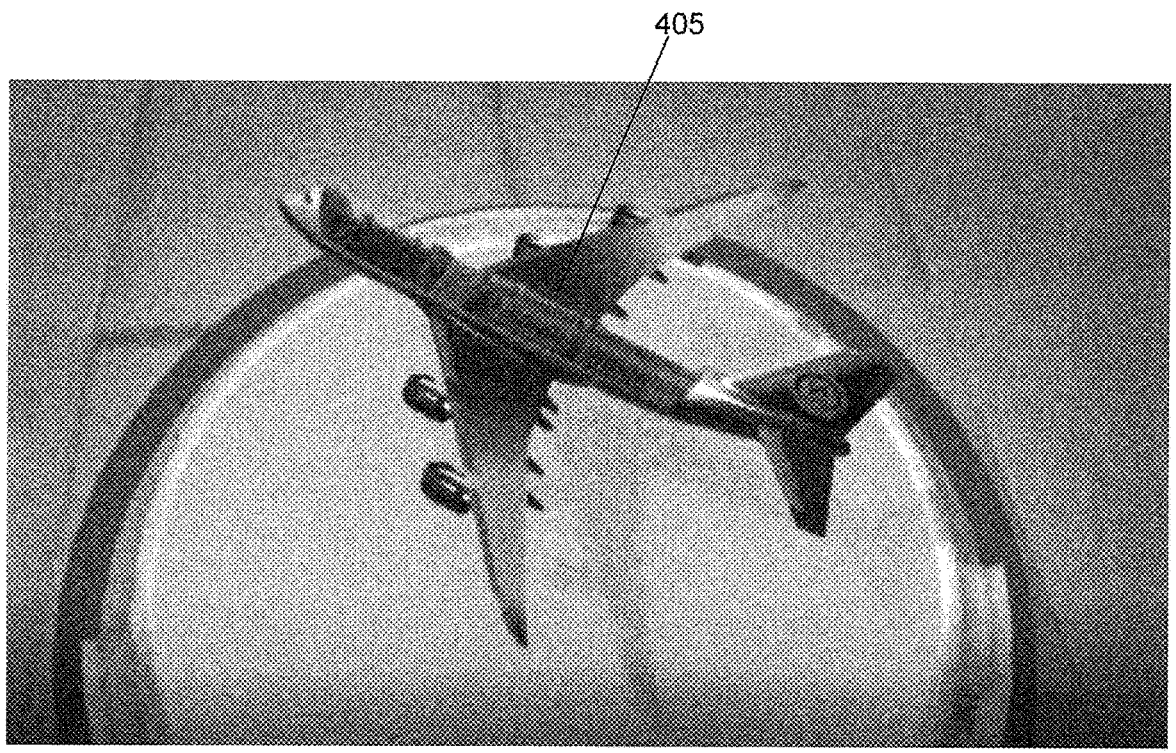
FIGS. 4A-4B are representations of an exemplary airplane cabin for seat selection in a virtual reality environment, consistent with embodiments of the present disclosure.
Figure 4B:
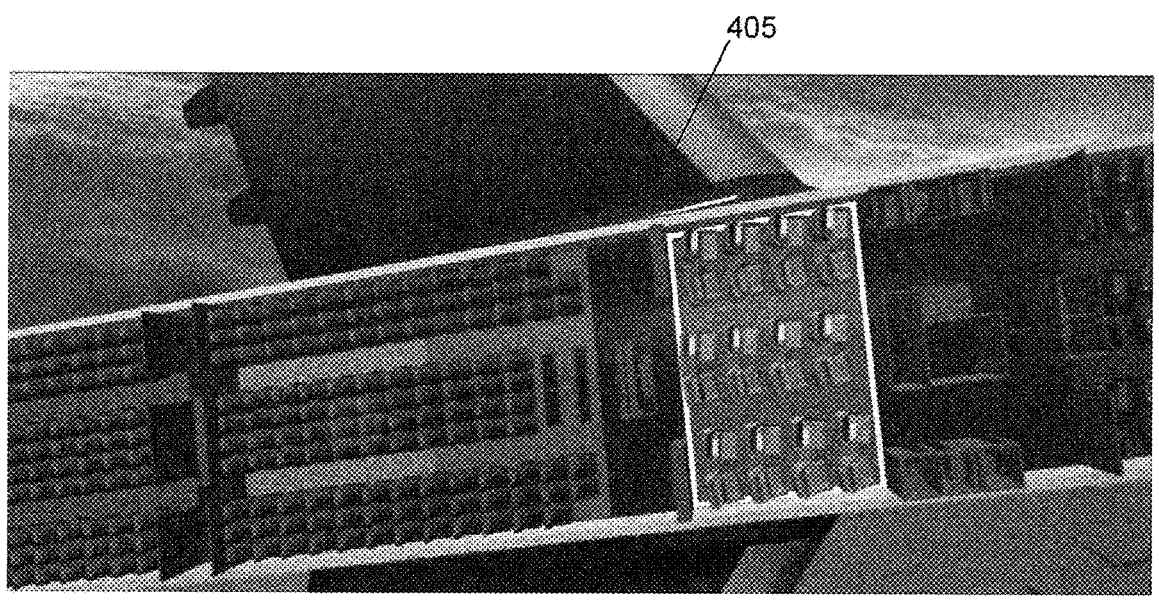

FIGS. 4A-4B are representations of an airplane cabin for seat selection in a virtual reality environment, consistent with embodiments of the present disclosure. FIGS. 4A-4B display the airplane cabin for seat selection in an exemplary airline travel booking. FIG. 4A is a perspective, transparent view of airplane 405 showing the airplane cabin. FIG. 4B is a top, transparent view of airplane 405 showing available seats in the airplane cabin for seat selection. By way of example, a user can extend his or her arm using, hand controller 385 of FIG. 3C, to move airplane 405. A user can move airplane 405 in the virtual reality environment in order to view a different portion of the cabin and choose a seat.

Figure 5:
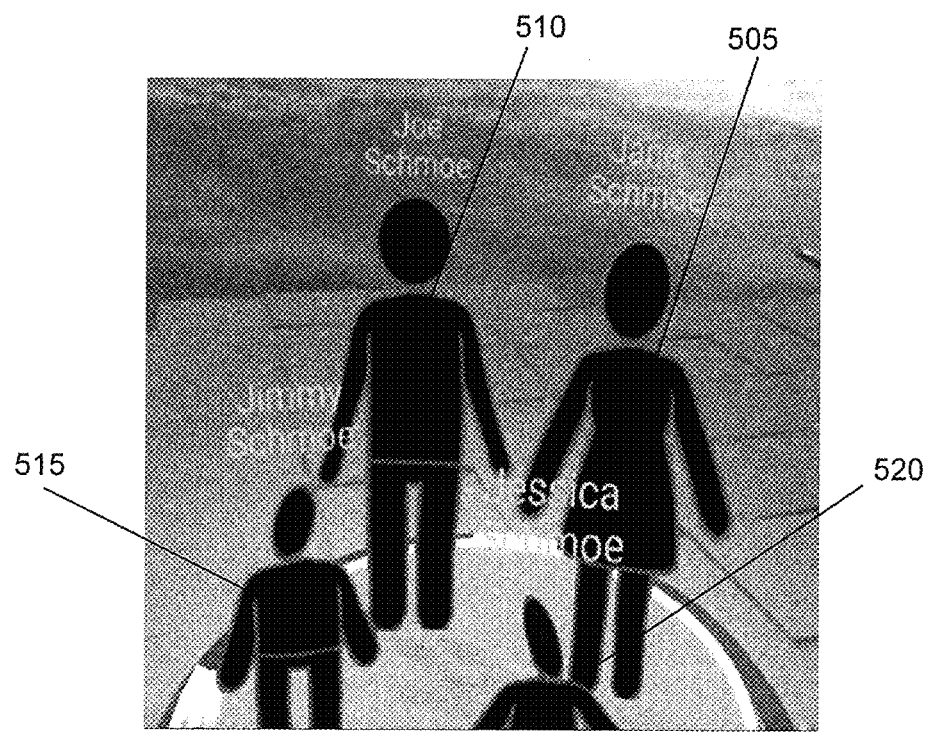
FIG. 5 is a representation of avatars in a virtual reality environment, consistent with embodiments of the present disclosure.

FIG. 5 is a representation of avatars 505-520 in a virtual reality environment, consistent with embodiments of the present disclosure. First avatar 505 (Jane Schmoe), second avatar 510 (Joe Schmoe), third avatar 515 (Jimmy Schmoe), and fourth avatar 520 (Jessica Schmoe) can be grasped and placed by a user for seat selection, for example, on airplane 405 of FIGS. 4A-4B.

As an example of a specific interaction and in relation to FIG. 5, a user can grasp fourth avatar 520, Jessica Schmoe, and move fourth avatar 520 around the virtual reality environment using, for example, hand controller 385 of FIG. 3C. The user can move fourth avatar 520 to hover on or within a seat zone in airplane 405 of FIGS. 4A-4B. Then, the user can release fourth avatar 520 with hand controller 385 of FIG. 3C to place fourth avatar 520 in a specific seat on airplane 405. By way of example, the user can reposition fourth avatar 520 or grasp remaining avatars 505-515 for seat selection. Upon seat selection, each seat assignment can be provided to one or more data sources. Moreover, seat availability can be filtered by contextual information associated with a user from one or more data sources.

Figure 6A:
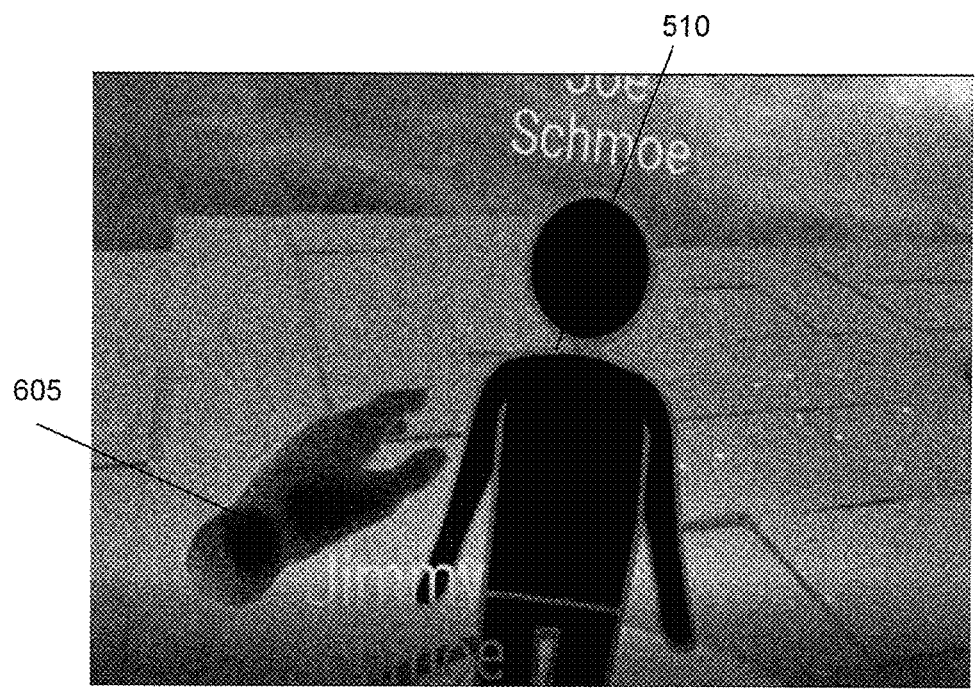
FIGS. 6A-6C are representations of exemplary interactions for seat selection for an avatar, consistent with embodiments of the present disclosure.
Figure 6B:
Figure 6C:
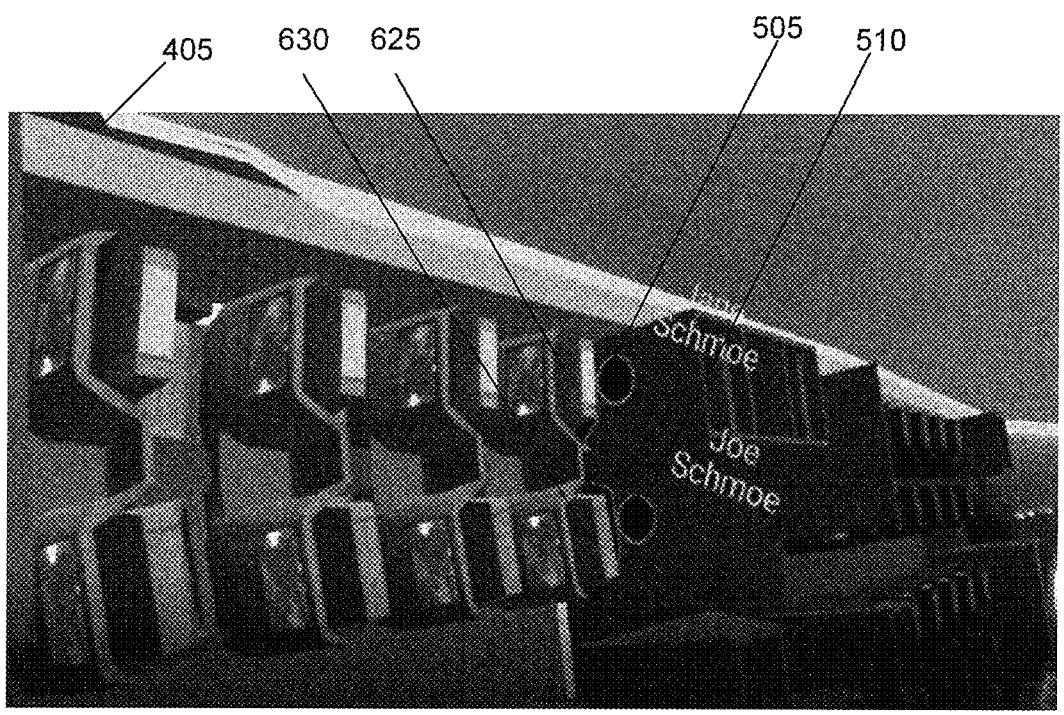

FIGS. 6A-6C are representations of exemplary interactions for seat selection for an avatar, consistent with embodiments of the present disclosure. FIG. 6A depicts virtual reality hand 605 reaching to grasp second avatar 510, Joe Schmoe. By way of example, a user can extend his or her arm using, hand controller 385 of FIG. 3C, to move virtual reality hand 605. The user can move second avatar 510 to hover over an available seat in airplane 405, causing the seat to become highlighted, as depicted in FIG. 6B. FIG. 6B further depicts various available seats on airplane 405, including first available seat 625, second available seat 630, third available seat 635, and fourth available seat 640. In FIG. 6B, second avatar 510, Joe Schmoe, is positioned by a user for release over second available seat 630, which is highlighted based on the positioning of second avatar 630 with respect to airplane 405. The highlighted area indicates where the avatar will be seated upon the user releasing the avatar with hand controller 385 of FIG. 3C. Upon release, second avatar 510 is delivered to second available seat 630 of airplane 405, as depicted in FIG. 6C. In some embodiment, the delivery of the avatar to a seat can cause the avatar to be assigned to that seat.

Simultaneous with the seat being highlighted, second avatar 510 can be adapted to include an arrow. The arrow can be directed towards the highlighted seat. The arrow and the highlighted seat can exemplify where the avatar will be delivered. Specifically, the avatar can be delivered to a seat by, for example, the user releasing the avatar using hand controller 385. In some embodiments, it is appreciated that the arrow can be used without the highlighting of the seat. Further, it is appreciated that the highlighting of the seat can be used without the arrow. FIG. 6C depicts first avatar 505 seated in first available seat 625 as well as second avatar 510 seated in second available seat 630 of airplane 405 with all other remaining seats empty. All other seats are available for the user to seat remaining avatars, third avatar 515 and fourth avatar 520.

For an available seat in a seatmap, an exemplary high-level algorithm for creating a seat zone for an avatar can include: (1) finding next nearby available seat in each of four or more horizontal directions (forward, backward, left, right, etc); (2) capturing position of an available seat edge that is closest to the next available seat; (3) capturing position of a nearby available seat edge that is closest to the available seat; (4) determine midpoint between the edge of the available seat and the edge of the nearby available seat; (5) if no nearby available seat exists in that direction, then calculate point at edge of aircraft seating boundary; and (6) create a bounding seat zone around seat, where sides are placed at calculated points, bottom is placed at base of seat, and top is placed at some distance above seat. While the above embodiments refer to a seat edge, it is appreciated that some other points of the seats (e.g., such as the midpoints of the seat) can also be used for creating a seat zone.

Figure 7A:
FIGS. 7A-7D are representations of exemplary interactions for seat selection for a subsequent avatar, consistent with embodiments of the present disclosure.
Figure 7B:
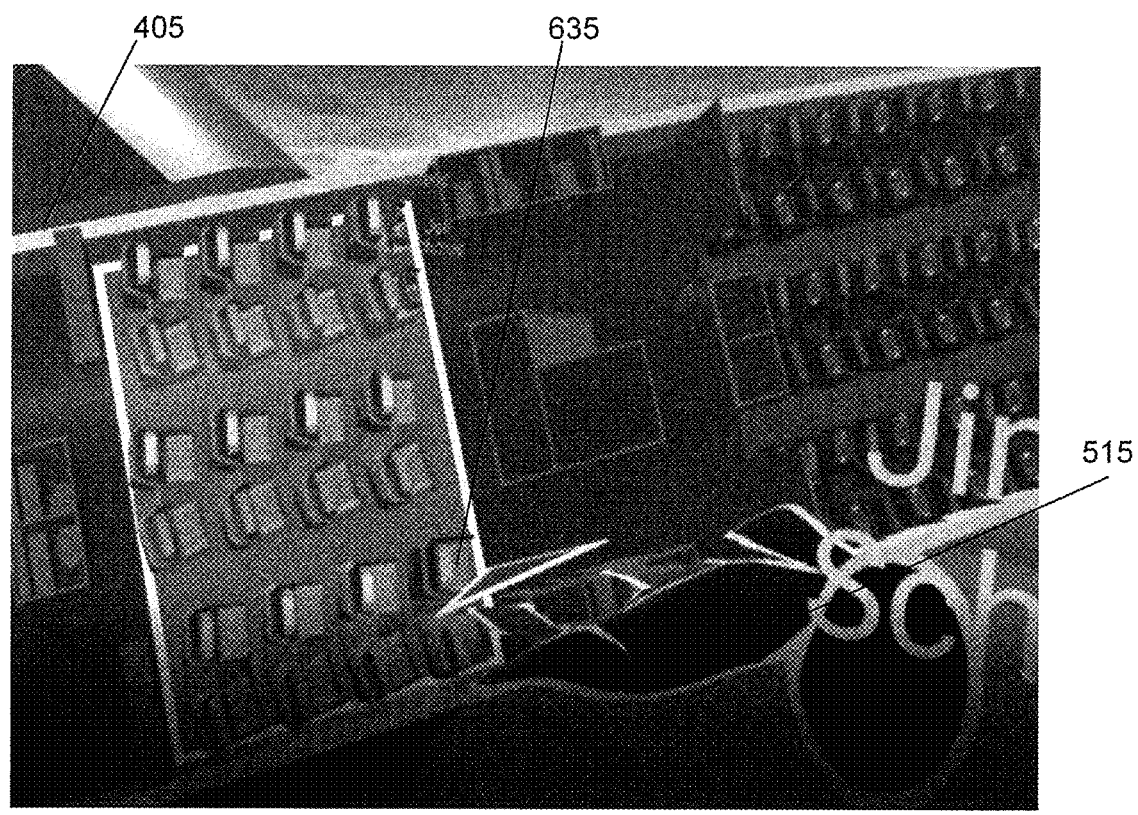
Figure 7C:
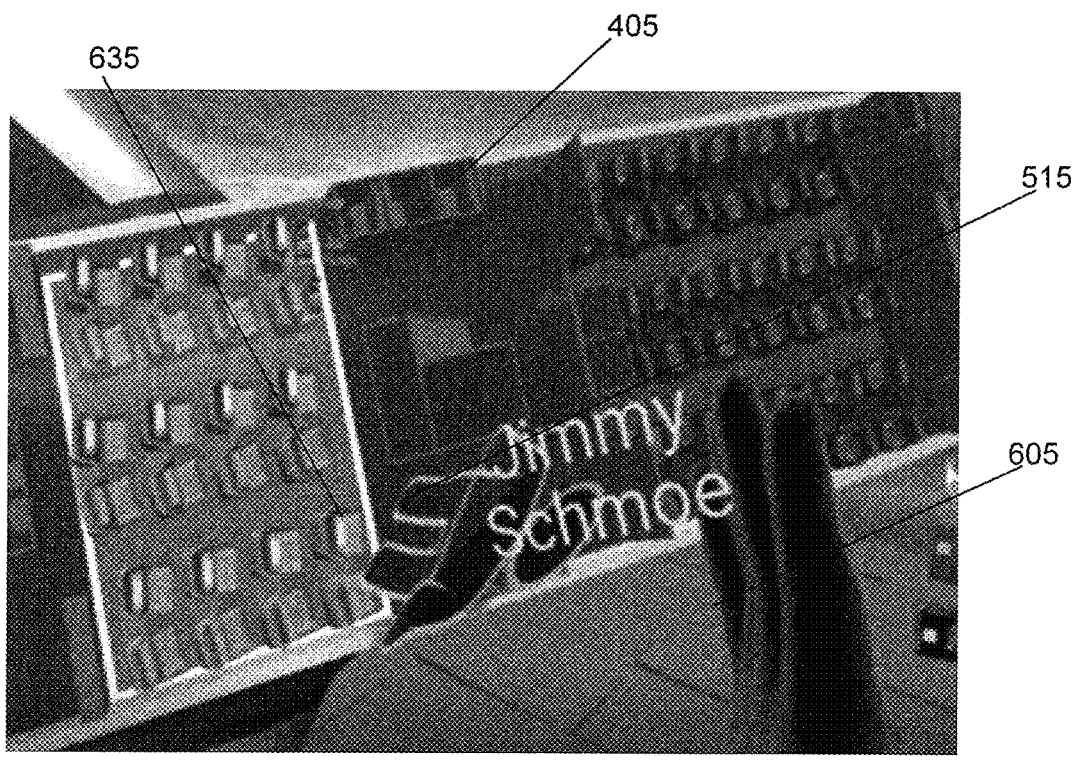
Figure 7D:
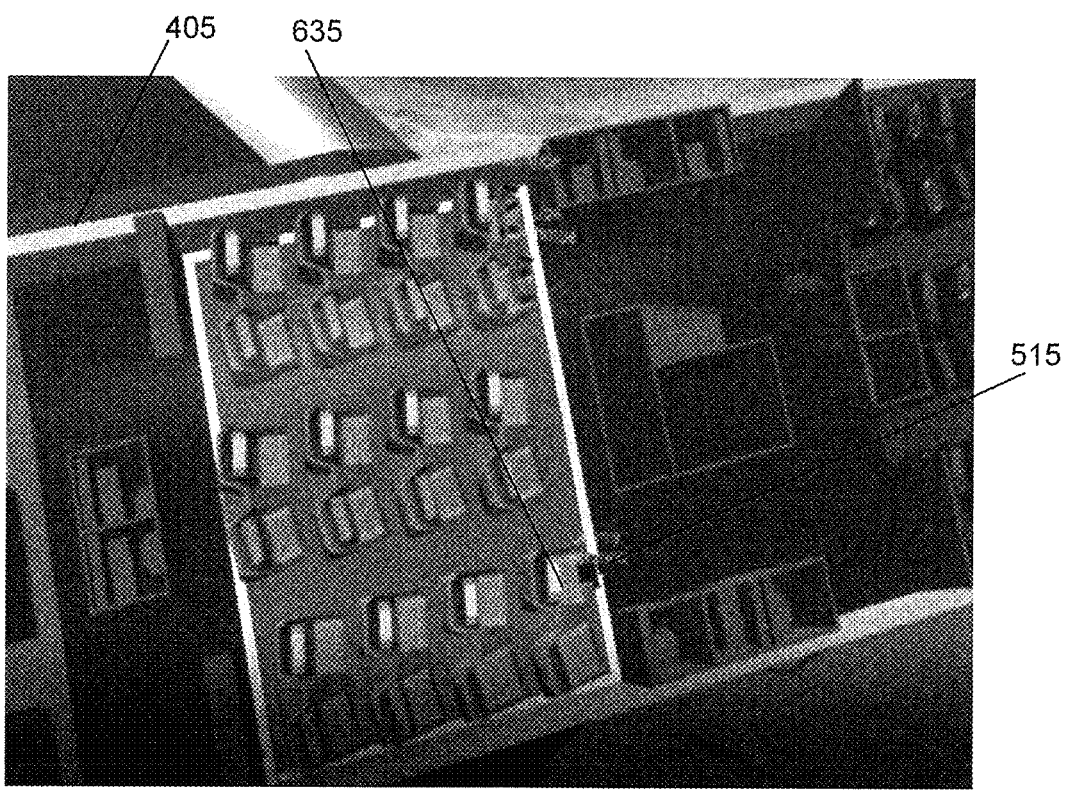

FIGS. 7A-7D are representations of exemplary interactions for seat selection for a subsequent avatar, consistent with embodiments of the present disclosure. FIG. 7A depicts virtual reality hand 605 reaching to grasp third avatar 515, Jimmy Schmoe. By way of example, a user can extend his or her arm using hand controller 385 of FIG. 3C, to move virtual reality hand 605. The user can move third avatar 515 to hover over an available seat in airplane 405, as depicted in FIG. 7B. FIG. 7B further depicts various available seats and other seated avatars. Third avatar 515 is positioned over third available seat 635 which is highlighted. The highlighted seat indicates where the avatar will be delivered or seated upon release. Simultaneous with the seat being highlighted, third avatar 515 can be adapted to include an arrow. The arrow can be directed towards the highlighted seat. The arrow and the highlighted seat can exemplify where the avatar will be delivered. Specifically, the avatar can be delivered to a seat by, for example, the user releasing the avatar using hand controller 385. FIG. 7C depicts third avatar 515 being released from virtual reality hand 605 in the process of being seated in third available seat 635 of airplane 405. FIG. 7D depicts third avatar 515 seated in third available seat 635 as well as other seated avatars in airplane 405. While it is appreciated that the avatar can be delivered to a seat by, for example, the user releasing the avatar using hand controller 385, in other embodiments, the avatar can be delivered to a seat by, for example, the user hovering the avatar over an available seat for a specified amount of time using hand controller 385.

Figure 8:
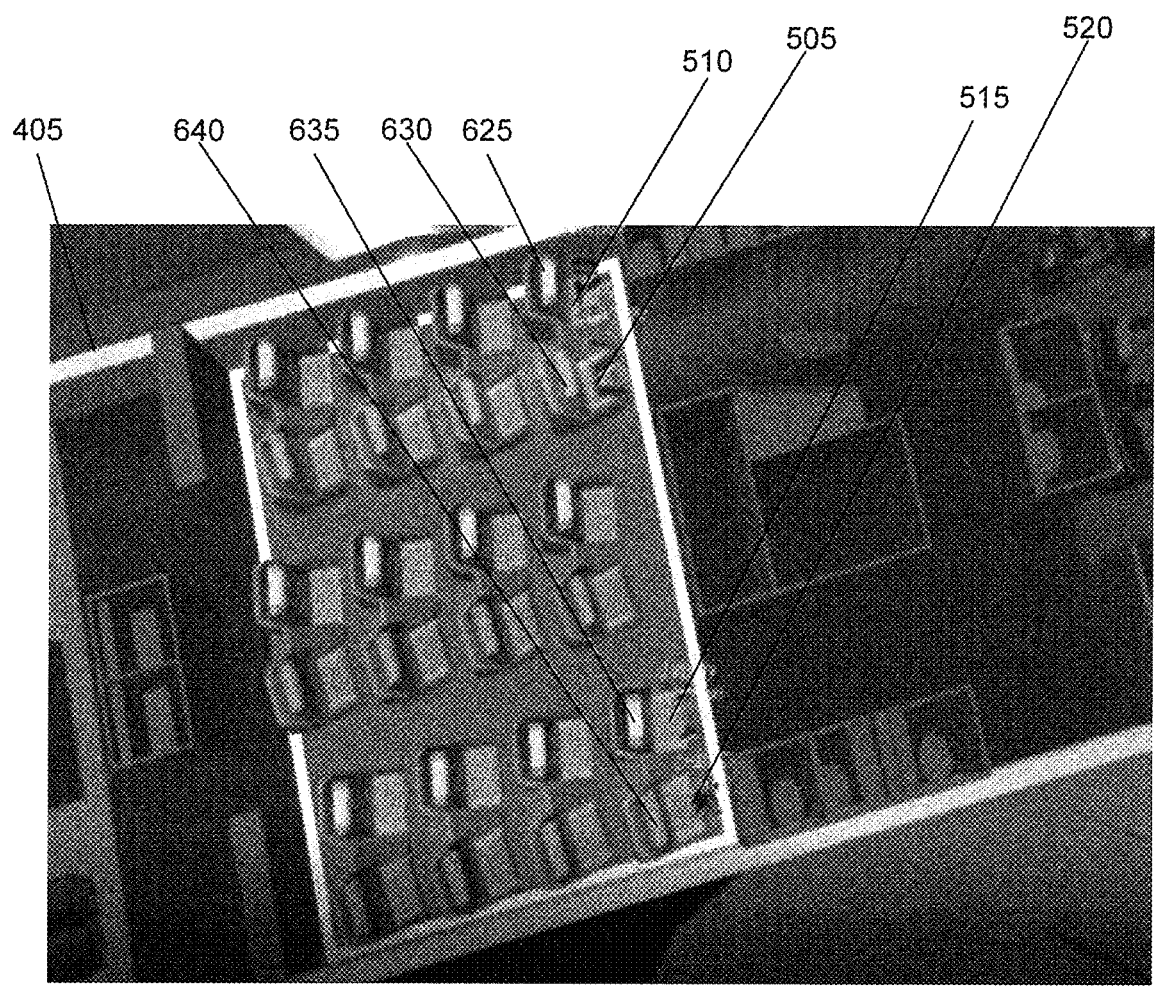
FIG. 8 is a representation of avatars seated in the airplane cabin of FIGS. 4A-4B, consistent with embodiments of the present disclosure.

FIG. 8 is a representation of four avatars seated in the airplane cabin of FIGS. 4A-4B, consistent with embodiments of the present disclosure. FIG. 8 depicts first avatar 510, Jane, seated in first available seat 625, second avatar 510, Joe, seated in second available seat 630, third avatar 515, Jimmy, seated in third available seat 635, and fourth avatar 520, Jessica, seated in fourth available seat 640 of airplane 405. The user can move any of the seated avatars into other available seats around the selected seats by, for example, extending his or her arm using, hand controller 385 of FIG. 3C, to move the avatars around.

Referring back to FIG. 6B, when a seat is highlighted it is because the user moved an avatar in vicinity of a seat zone. Each available seat and/or each seat occupied by a controllable avatar can have a seat zone. The dimensions of this seat zone is dependent on other nearby available seats and their respective seat zones. Because, for example, all of the seats around seat 640 of FIG. 6B were available, seat 640's seat zone is configured to be tight around the seat. A user must hover an avatar on or within seat 640's small seat zone for the seat to become highlighted. If, on the other hand, a seat is the only seat available in the cabin, then that seat's seat zone can be larger. Hovering an avatar far from the available seat can still highlight the available seat.

In some embodiments, a user can switch seats of one or more seated controllable avatars (i.e., avatars that are controllable by the user). By way of example, when a user delivers an avatar to a seat, that seat can maintain its seat zone. For example, the user can pick up an unseated avatar, second avatar 510, and deliver second avatar 510 to the seat occupied by first avatar 505. Accordingly, first avatar 505 can switch positions with second avatar 510. In yet other embodiments, the user can pick up a seated avatar and switch its seat with another seated avatar.

Figure 9A:
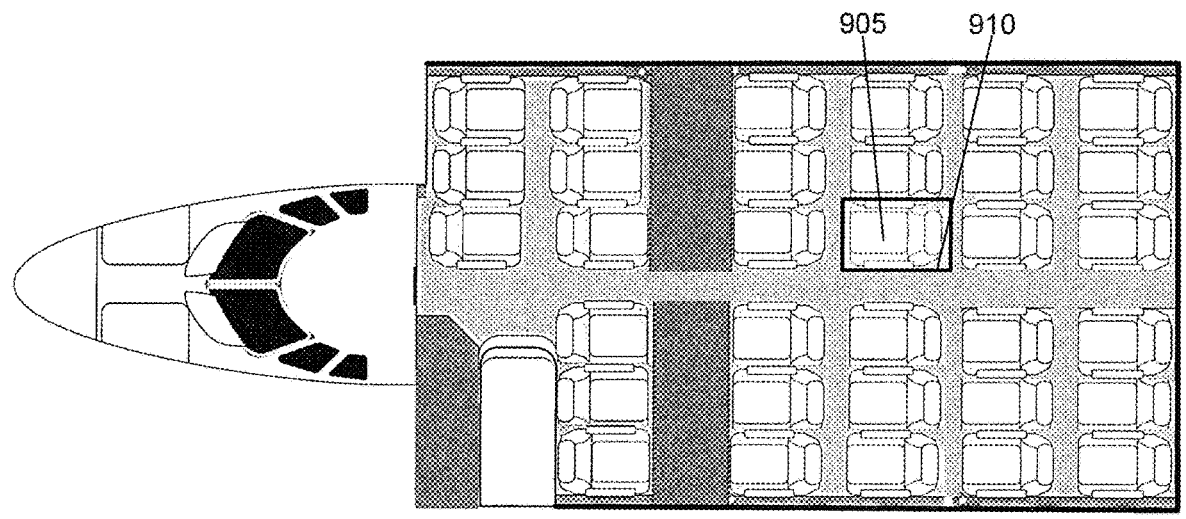
FIGS. 9A-9B are representations of an exemplary seat zone where surrounding seats are not occupied, consistent with embodiments of the present disclosure.
Figure 9B:
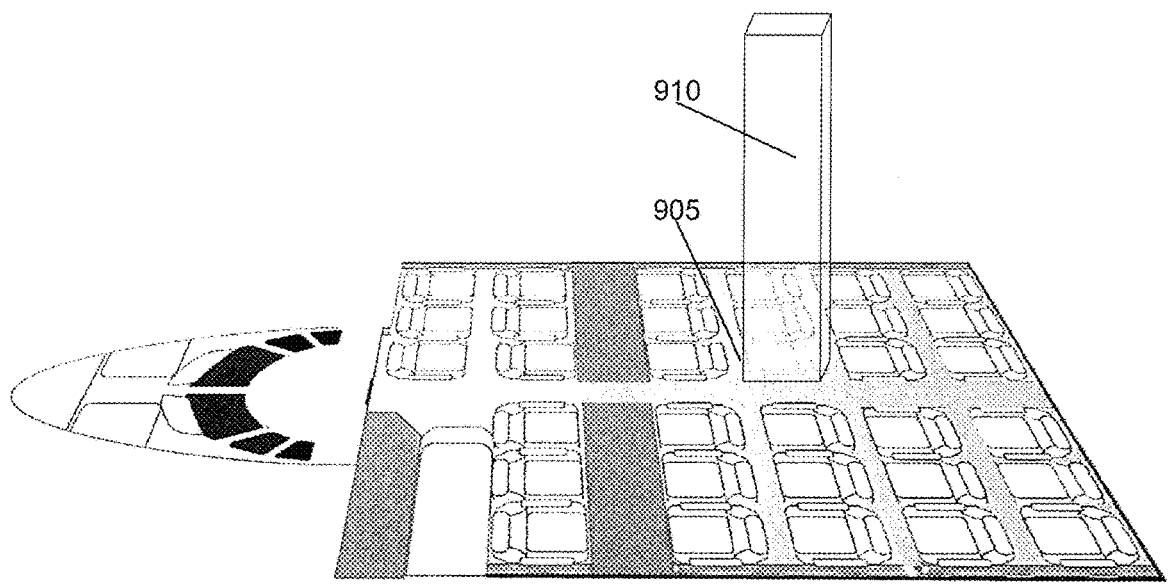

FIGS. 9A-9B are representations of an exemplary seat zone where surrounding seats are not occupied, consistent with embodiments of the present disclosure. FIG. 9A depicts a top plan view of seat zone 910 in an airplane's cabin. FIG. 9B depicts a perspective view of seat zone 910 in an airplane's cabin. In some embodiments, seat zone 910 surrounds first available seat 905 by extending above and around first available seat 905. Furthermore, seat zone 910 can change size based on its location in the airplane cabin and on occupancy of seats in the airplane's cabin. Moreover, as depicted in FIGS. 6B and 7B, a seat is highlighted when an avatar is in the vicinity of a corresponding seat zone. By way of example, in FIG. 9A, seat zone 910 is configured tightly around first available seat 905. The remaining empty seats in the cabin of FIG. 9A each have their own seat zone that does not overlap with seat zone 910. However, seat zone 910 can expand if there are occupied seats surrounding first available seat 905. In some embodiments, seat zone 910 can be larger if seat 905 is a window seat, aisle seat, emergency aisle seat, premium seat, or first class seat.

By way of example, a user can extend his or her arm using hand controller 385 of FIG. 3C, to move an avatar to the vicinity of seat zone 910 and place the avatar in first available seat 905 that is highlighted. The vicinity of the seat zone can include when the avatar is positioned within the seat zone, when the avatar is positioned to touch the seat zone, and when the avatar is positioned to touch first and second seat zones. When the avatar is positioned to touch two or more seat zones, the avatar can be seated in the available seat in whichever seat zone the avatar has the highest percentage of being in. For example, if a first seat zone has 51% of the avatar while a second seat zone has only 49% of the avatar, the avatar would be assigned to the first seat zone. If the avatar is located in three seat zones simultaneously, and one seat zone had 40% of the avatar while the other two seat zones had only 30%, the avatar would be assigned to the seat zone having 40% of the avatar. Moreover, the available seat in the closest seat zone can be highlighted to depict to the user where the avatar will be seated.

Figure 10A:
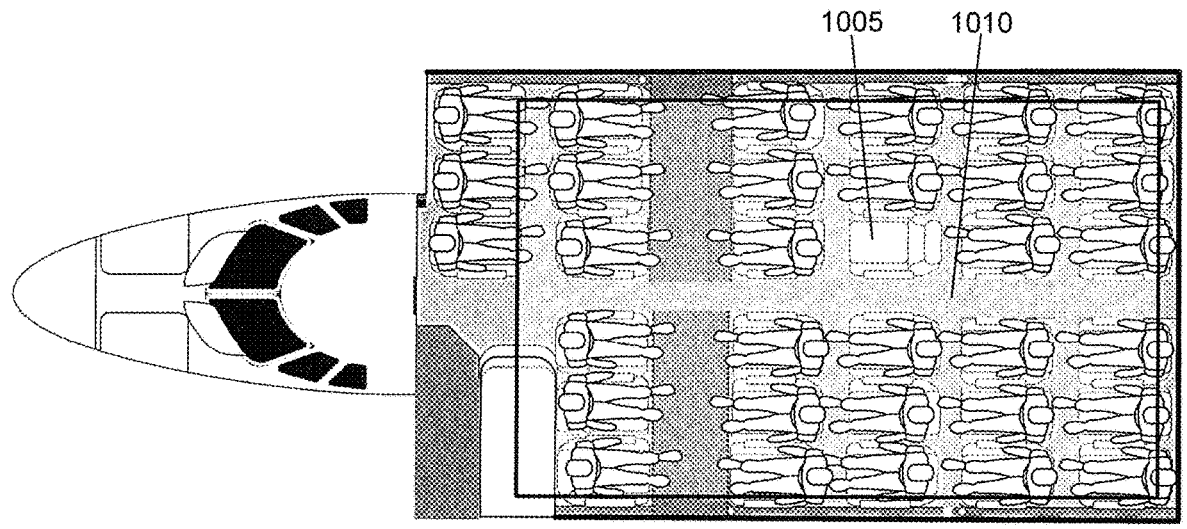
FIGS. 10A-10B are representations of an exemplary seat zone where surrounding seats are occupied, consistent with embodiments of the present disclosure.
Figure 10B:
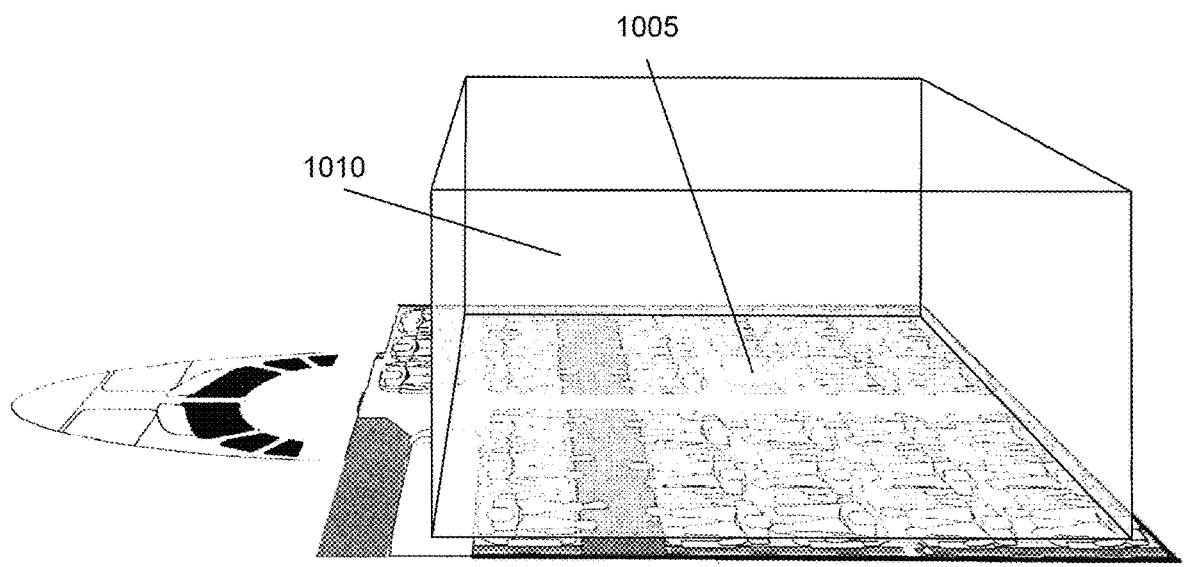

FIGS. 10A-10B are representations of a seat zone where surrounding seats are occupied, consistent with embodiments of the present disclosure. FIG. 10A depicts a top plan view of seat zone 1010 in an airplane's cabin. FIG. 10B depicts a perspective view of seat zone 1010 in an airplane's cabin. In some embodiments, seat zone 1010 surrounds first available seat 1005 by extending above and around first available seat 1005. Furthermore, seat zone 1010 can change size based on occupancy of seats in the airplane's cabin. By way of example, in FIG. 10A, seat zone 1010 is configured around first available seat 1005 and various others seats in the cabin. The other seats in the cabin of FIG. 10A do not have their own seat zone because they are already occupied. Thus, seat zone 1010 is a larger zone than seat zone 910 of FIG. 9A because of the occupied seats surrounding first available seat 1005. Moreover, while seat zone 1010 is shown as a rectangular prism or cube-like shape, it is appreciated that seat zone can be another three-dimensional shape such as spherical, cylindrical, a paraboloid (such as a bowl-like shape), or a combination of three dimensional shapes. For example, for window seats, the seat zone shape could be a combination of a rectangular prism and half cylindrical, where the shape of the seat zone above the seat itself could be a rectangular prism, while the shape above the position of the window next to the seat could be a half cylindrical shape.

By way of example, a user can extend his or her arm using, hand controller 385 of FIG. 3C, to move an avatar to the vicinity of seat zone 1010 and place it in first available seat 1005 that is highlighted. The vicinity of the seat zone can include when the avatar is positioned within the seat zone, when the avatar is positioned to touch the seat zone, and when the avatar is positioned to touch a first and second seat zones. When the avatar is positioned to touch two seat zones, the avatar is seated in the available seat in whichever seat zone the avatar is closest to. Moreover, the available seat in the closest seat zone can be highlighted to depict to the user where the avatar would be seated.

Figure 11A:
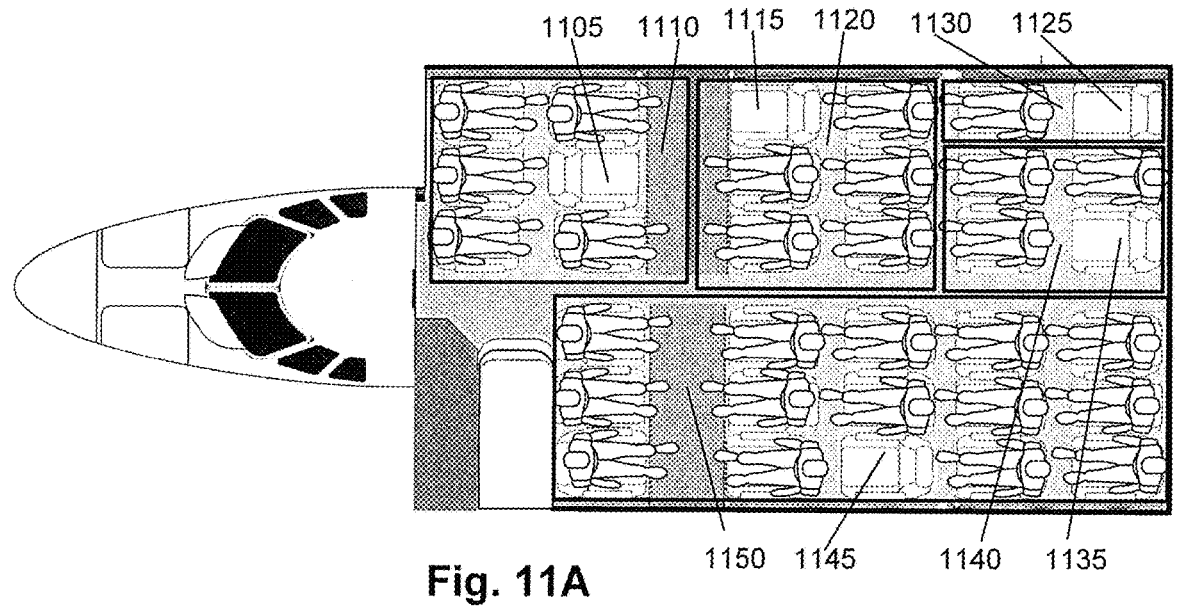
FIGS. 11A-11B are representations of multiple exemplary seat zones, consistent with embodiments of the present disclosure.
Figure 11B:
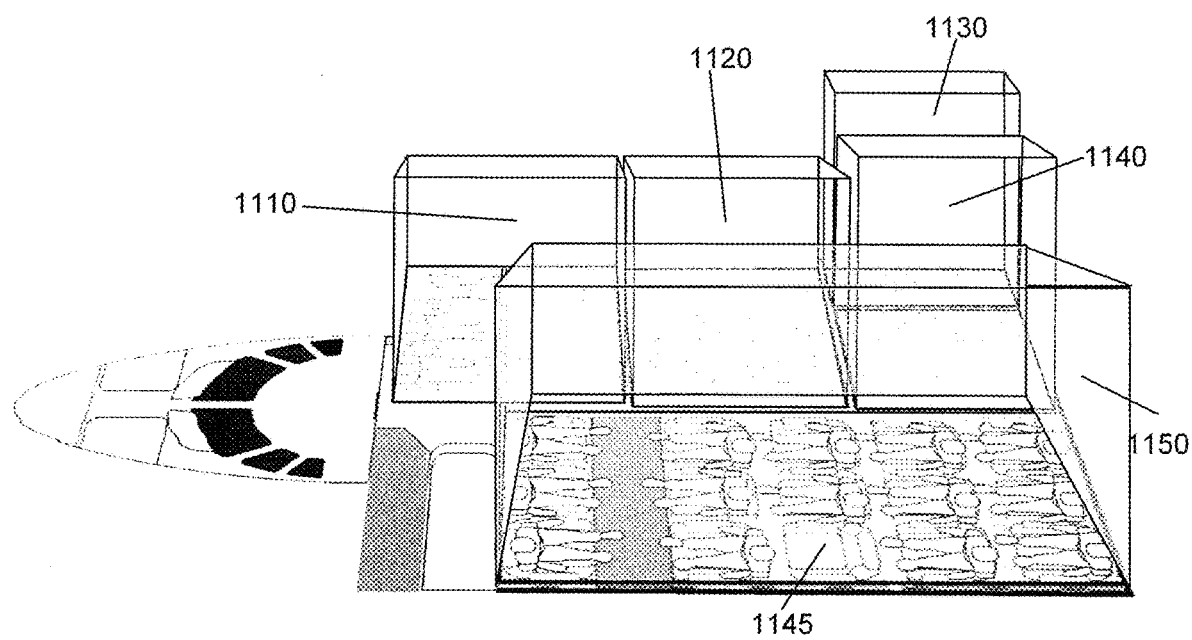

FIGS. 11A-11B are representations of multiple seat zones, consistent with embodiments of the present disclosure. FIG. 11A depicts a top plan view of multiple seat zones in an airplane's cabin. FIG. 11B depicts a perspective view of multiple seat zones corresponding to the only remaining seats in an airplane's cabin. In some embodiments, each seat zone surrounds an available seat by extending above and around the available seat. The seat zones can be visible or not visible to users. In some embodiments, the user can manipulate the airplane to view all of the airplane's seats and seat zones. Furthermore, each seat zone can change size based on occupancy of seats in the airplane's cabin. By way of example, seat zone 1110 surrounds first available seat 1105, seat zone 1120 surrounds second available seat 1115, seat zone 1130 surrounds third available seat 1125, seat zone 1140 surrounds fourth available seat 1135, and seat zone 1150 surrounds fifth available seat 1145. Seat zones can differ in shape, or horizontal size, based upon the position of available seats with respect to occupied seats around them and the closest remaining available seats on the airplane. In some embodiments the seat zones can differ in not only horizontal width and depth, but also in vertical height. In other embodiments, the seat zone width, depth, and height can change based on user preferences, based on seat attributes, or based on other avatars' seat locations.

By way of example, a user can extend his or her arm using, hand controller 385 of FIG. 3C, to move an avatar to the vicinity of any of the seat zone of FIGS. 11A-11B and be placed in the corresponding available seat that is highlighted. The vicinity of the seat zone can include when the avatar is positioned within the seat zone, when the avatar is positioned to touch the seat zone, and when the avatar is positioned to touch a first and second seat zones. When the avatar is positioned to touch two seat zones, the avatar can be seated in the available seat in whichever seat zone the avatar is more into. While it is appreciated that the avatar can be assigned to the seat zone it is more into, in other embodiments, the avatar can be assigned to the seat, rather than seat zone, it is closest to, when the avatar is located in more than one seat zone. Moreover, the available seat in the closest seat zone can be highlighted to depict to the user where the avatar would be seated. In another embodiment, when the avatar is positioned to touch two seat zones, the avatar can be seated in the available seat in whichever seat zone the avatar was hovering over for a longer period of time. By way of example, a user can extend his or her arm using, hand controller 385 of FIG. 3C, to move avatar over two available seats, for example, seat zones 1110 and 1120 of FIG. 11B. If the avatar is positioned to touch seat zone 1110 for 60% of a time period and seat zone 1120 for 40% of the time period, then the avatar will be assigned to the available seat in seat zone 1110.

Figure 12A:
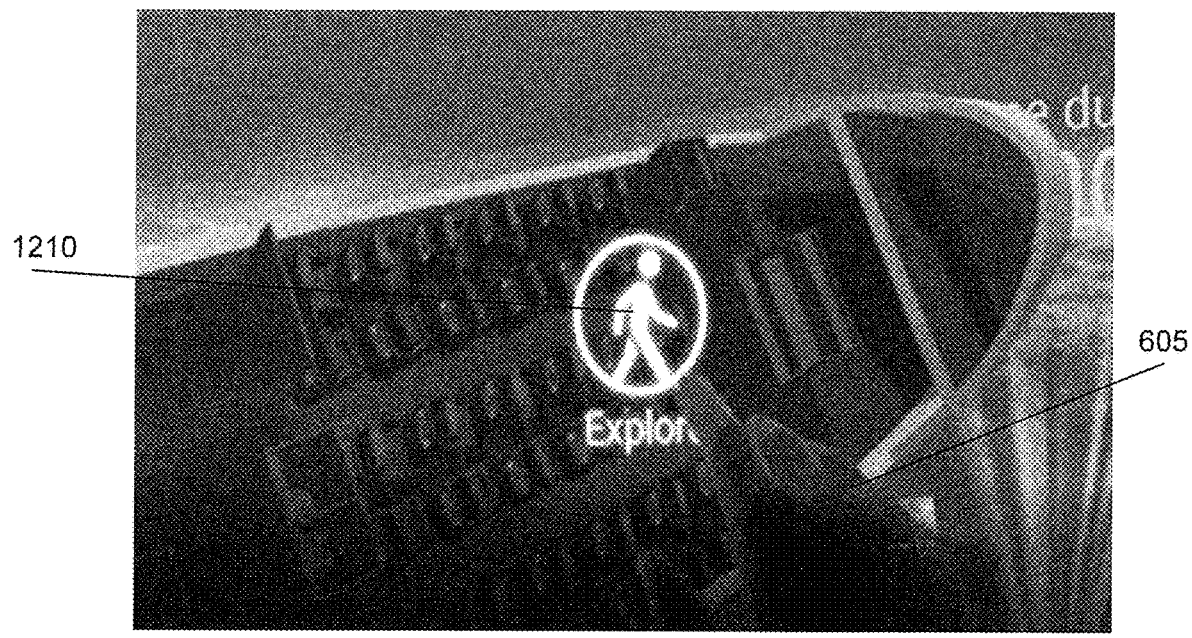
FIGS. 12A-12C are representations of exemplary interactions for cabin exploration in a virtual reality environment, consistent with embodiments of the present disclosure.
Figure 12B:
Figure 12C:

FIGS. 12A-12C are representations of exemplary interactions for cabin exploration in a virtual reality environment, consistent with embodiments of the present disclosure. By way of example, a user can extend his or her arm using, hand controller 385 of FIG. 3C, to move virtual reality hand 605 to select explore icon 1210 of FIG. 12A. In response to the selection, the user can view the airplane cabin as depicted in FIG. 12B. In another embodiment, the user can select seats from within the airplane cabin. In such an embodiment, the user can view the seat map from inside the aircraft. The user can select other icons including, for example, upgrade icon 1245 of FIG. 12C to view or upgrade to business class of the airplane cabin. FIG. 13 is a flowchart of an exemplary method 1300 for seat selection in a virtual reality environment, consistent with embodiments of the present disclosure. It will be readily appreciated that the illustrated procedure can be altered to delete steps or further include additional steps. It is appreciated that one or more computing devices (such as virtual reality system 140 of by itself or in combination with proprietary data sources 110, API 130, or virtual reality device 145) can perform the exemplary method and that the functionality described herein can be incorporated as hardware, software stored in the one or more computing devices, or any combination thereof.

After initial step 1301, the system can acquire (step 1310) flight information, wherein the flight information includes at least one of seating information regarding layout for the particular plane used for the flight and availability of seats from one or more data sources.

After being acquired, the virtual reality computing system can provide (step 1320) the flight information in the virtual reality environment (e.g., using virtual reality device 145 of FIG. 1). For example, occupied seats within cabin of airplane 405 of FIGS. 4A and 4B can be presented to the user in virtual reality device 145. Moreover, flight information can be filtered based on preference data and contextual information provided by external data sources 120 of FIG. 1. The user can interact with the virtual reality environment through physical motion and through controllers (e.g., hand controller 385 of FIG. 3C). The virtual reality computing system can receive (step 1330), from a virtual reality device (e.g., through virtual reality device 145 of FIG. 1 or hand controller 385 of FIG. 3C), a user's movements of an avatar in the virtual reality environment, wherein the avatar represents an individual having pre-stored information. Virtual reality system 140, via virtual reality device 145, of FIG. 1 can detect a manipulation of the virtual reality environment by detecting a user's movement pattern. This movement pattern can be associated with one of the virtual controls.

The virtual reality computing system can further determine (step 1340), in the virtual reality environment, a position of the avatar with respect to a first seat zone surrounding a first available seat. For example, the user's manipulation of hand controller 385 of FIG. 3C can suggest a movement of an avatar with respect to a seat zone. In certain embodiments, the vicinity of the seat zone can include when the avatar is positioned within the seat zone, when the avatar is positioned to touch the seat zone, and when the avatar is positioned to touch a first and second seat zones. The position of the avatar over an available seat can highlight the available seat. The highlighted area indicates where the avatar will be seated upon the user releasing the avatar with hand controller 385 of FIG. 3C. Upon release, the avatar can be delivered to the available seat, as depicted in FIG. 6C. Simultaneous with the seat being highlighted, the avatar can be adapted to include an arrow pointing to the seat where the avatar would be seated if released. The arrow can be directed towards the highlighted seat. The arrow and the highlighted seat can exemplify where the avatar will be delivered.

Moreover, the virtual reality computing system can assign (step 1350) the avatar to the first available seat in response to the virtual reality computing system receiving a deliver command when the avatar is in vicinity of the first seat zone surrounding the first available seat. The virtual reality computing system can receive a delivery command in response to the user's manipulation of hand controller 385 of FIG. 3C, such as releasing the avatar for delivery to a specific seat on the airplane.

After the assignment, the process is completed (step 1399).

Although the previous systems are described in terms of a travel context, the system can be used for many different domains. The features used and data that is incorporated can be based on the specific the domain in which the disclosed embodiments are deployed.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable storage medium storing instructions that are executable by at least one processor of a virtual reality computing system to cause a virtual reality computing system to perform a method comprising:

acquiring flight information, wherein the flight information includes at least one of seating information regarding layout and availability of seats from one or more data sources;

providing the flight information in a virtual reality environment;

receiving, from a virtual reality device, a user's movement of an avatar in the virtual reality environment, wherein the avatar represents an individual having pre-stored information;

determining, in the virtual reality environment, a position of the avatar with respect to a first seat zone surrounding a first available seat, wherein the first seat zone is a dynamic bounded three-dimensional virtual area surrounding the first available seat and the dynamic bounded three-dimensional virtual area is dynamically adjusted based on availability or unavailability of seats surrounding the first available seat; and assigning the avatar to the first available seat in response to the virtual reality computing system receiving a deliver command when the avatar is released within the dynamic bounded three-dimensional virtual area of the first seat zone surrounding the first available seat.

2. The non-transitory computer readable storage medium of claim 1, wherein the set of instructions that is executable by the at least one processor of the virtual reality computing system to cause the virtual reality computing system to further perform:

highlighting the first available seat based on the determination that the avatar is within the dynamic bounded three-dimensional virtual area of the first seat zone.

3. The non-transitory computer readable storage medium of claim 1, wherein the set of instructions that is executable by the at least one processor of the virtual reality computing system to cause the virtual reality computing system to further perform:

providing a seat assignment to the one or more data sources.

4. The non-transitory computer readable storage medium of claim 1, wherein surrounding the first available seat includes extending above and around the first available seat.

5. The non-transitory computer readable storage medium of claim 1, wherein within the dynamic bounded three-dimensional virtual area of the first seat zone includes when the avatar is positioned within the bounds of the first seat zone.

6. The non-transitory computer readable storage medium of claim 1, wherein within the dynamic bounded three-dimensional virtual area of the first seat zone includes when the avatar is positioned to touch the first seat zone and a second seat zone, and the avatar is closer to the first available seat in the first seat zone than a second available seat in the second seat zone.

7. The non-transitory computer readable storage medium of claim 1, further comprising:

obtaining contextual information associated with the user from the one or more data sources; and filtering the availability of seats based on contextual information.

8. The non-transitory computer readable storage medium of claim 1, wherein the user's movements are received from a virtual reality controller.

9. The non-transitory computer readable storage medium of claim 1, wherein the user's movements are received from an inertial measurement unit of the virtual reality device.

10. The non-transitory computer readable storage medium of claim 1, wherein environmental movements in a physical environment of the user are received from an inertial measurement unit of the virtual reality device and the updates to the virtual reality environment are based on the environmental movements.

11. The non-transitory computer readable storage medium of claim 1, wherein:

every seat zone has one available seat; and a total number of seat zones is a total number of available seats.

12. The non-transitory computer readable storage medium of claim 1, wherein the dynamic bounded three-dimensional virtual area is formed by seat edges close to the first available seat and nearby available seats in all directions.

13. A method for interacting with a virtual reality environment performed by a virtual reality computing system comprising:

acquiring flight information, wherein the flight information includes at least one of seating information regarding layout and availability of seats from one or more data sources;

providing the flight information in a virtual reality environment;

receiving, from a virtual reality device, a user's movement of an avatar in the virtual reality environment, wherein the avatar represents an individual having pre-stored information;

determining, in the virtual reality environment, a position of the avatar with respect to a first seat zone surrounding a first available seat, wherein the first seat zone is a dynamic bounded three-dimensional virtual area surrounding the first available seat and the dynamic bounded three-dimensional virtual area is dynamically adjusted based on availability or unavailability of seats surrounding the first available seat; and assigning the avatar to the first available seat in response to the virtual reality computing system receiving a deliver command when the avatar is released within the dynamic bounded three-dimensional virtual area of the first seat zone surrounding the first available seat.

14. The method of claim 13, further comprising:

highlighting the first available seat based on the determination that the avatar is within the dynamic bounded three-dimensional virtual area of the first seat zone.

15. The method of claim 13, further comprising providing a seat assignment to the one or more data sources.

16. The method of claim 13, wherein surrounding the first available seat includes extending above and around the first available seat.

17. The method of claim 13, wherein within the dynamic bounded three-dimensional virtual area of the first seat zone includes when the avatar is positioned within the bounds of the first seat zone.

18. The method of claim 13, wherein within the dynamic bounded three-dimensional virtual area of the first seat zone includes when the avatar is positioned to touch the first seat zone and a second seat zone, and the avatar closer to the first available seat in the first seat zone than a second available seat in the second seat zone.

19. The method of claim 13, further comprising:

obtaining contextual information associated with the user from the one or more data sources; and filtering the availability of seats based on contextual information.

20. The method of claim 13, wherein the user's movements are received from a virtual reality controller.

21. The method of claim 13, wherein the user's movements are received from an inertial measurement unit of the virtual reality device.

22. The method of claim 13, wherein environmental movements in a physical environment of the user are received from an inertial measurement unit of the virtual reality device and the updates to the virtual reality environment are based on the environmental movements.

23. The method of claim 13, wherein the dynamic bounded three-dimensional virtual area is formed by seat edges close to the first available seat and nearby available seats in all directions.

24. A virtual reality computing system comprising:
a data storage configured to store at least one movement pattern associated with one or more virtual reality controls;
one or more processors configured to cause the virtual reality computing system to:
acquire flight information, wherein the flight information includes at least one of seating information regarding layout and availability of seats from one or more data sources;
provide the flight information in a virtual reality environment;
receive, from a virtual reality device, a user's movements of an avatar in the virtual reality environment, wherein the avatar represents an individual having pre-stored information;
determine, in the virtual reality environment, a position of the avatar with respect to a first seat zone surrounding a first available seat, wherein the first seat zone is a dynamic bounded three-dimensional virtual area surrounding the first available seat and the dynamic bounded three-dimensional virtual area is dynamically adjusted based on availability or unavailability of seats surrounding the first available seat; and
assign the avatar to the first available seat in response to the virtual reality computing system receiving a deliver command when the avatar is released within the dynamic bounded three-dimensional virtual area of the first seat zone surrounding the first available seat.

25. The virtual reality computing system of claim 24, wherein the one or more processors are further configured to cause the virtual reality computing system to:
highlight the first available seat based on the determination that the avatar is within the dynamic bounded three-dimensional virtual area of the first seat zone.

26. The virtual reality computing system of claim 24, wherein the one or more processors are further configured to cause the virtual reality computing system to provide a seat assignment to the one or more data sources.

27. The virtual reality computing system of claim 24, wherein surrounding the first available seat includes extending above and around the first available seat.

28. The virtual reality computing system of claim 24, wherein within the dynamic bounded three-dimensional virtual area of the first seat zone includes when the avatar is positioned within the bounds of the first seat zone.

29. The virtual reality computing system of claim 24, wherein within the dynamic bounded three-dimensional virtual area of the first seat zone includes when the avatar is positioned to touch the first seat zone and a second seat zone, and the avatar closer to the first available seat in the first seat zone than a second available seat in the second seat zone.

30. The virtual reality computing system of claim 24, wherein the one or more processors are further configured to cause the virtual reality computing system to:
obtain contextual information associated with the user from the one or more data sources; and
filter the availability of seats based on contextual information.

31. The virtual reality computing system of claim 24, wherein the user's movements are received from a virtual reality controller.

32. The virtual reality computing system of claim 24, wherein the user's movements are received from an inertial measurement unit of the virtual reality device.

33. The virtual reality computing system of claim 24, wherein environmental movements in a physical environment of the user are received from an inertial measurement unit of the virtual reality device and the updates to the virtual reality environment are based on the environmental movements.

34. The virtual reality computing system of claim 24, wherein the dynamic bounded three-dimensional virtual area is formed by seat edges close to the first available seat and nearby available seats in all directions.

* * * * *

UNITED STATES PATENT AND TRADEMARK OFFICE
CERTIFICATE OF CORRECTION

| | |
|---|---|
| PATENT NO. | : 11,579,744 B2 |
| APPLICATION NO. | : 15/629719 |
| DATED | : February 14, 2023 |
| INVENTOR(S) | : Justin Steven Wilde |

It is certified that error appears in the above-identified patent and that said Letters Patent is hereby corrected as shown below:

In the Claims

Claim 3, Column 21, Line 35, "to cause" should read as --causes--.

Claim 18, Column 22, Line 58, "avatar closer" should read as --avatar is closer--.

Claim 29, Column 24, Line 20, "avatar closer" should read as --avatar is closer--.

Signed and Sealed this
Nineteenth Day of September, 2023

*Katherine Kelly Vidal*

Katherine Kelly Vidal
*Director of the United States Patent and Trademark Office*